United States Patent
Mulani et al.

(10) Patent No.: US 11,836,354 B2
(45) Date of Patent: Dec. 5, 2023

(54) DISTRIBUTION OF LOGICAL-TO-PHYSICAL ADDRESS ENTRIES ACROSS MULTIPLE MEMORY AREAS

(71) Applicant: Western Digital Technologies, Inc., San Jose, CA (US)

(72) Inventors: Jameer Mulani, Bangalore (IN); Kapil Sundrani, Bangalore (IN); Anindya Rai, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/493,722

(22) Filed: Oct. 4, 2021

(65) Prior Publication Data

US 2022/0027063 A1    Jan. 27, 2022

Related U.S. Application Data

(63) Continuation of application No. 16/824,587, filed on Mar. 19, 2020, now Pat. No. 11,221,771, which is a continuation of application No. 15/641,708, filed on Jul. 5, 2017, now Pat. No. 10,635,331.

(51) Int. Cl.
*G06F 3/06* (2006.01)
*G06F 12/02* (2006.01)

(52) U.S. Cl.
CPC .......... *G06F 3/0619* (2013.01); *G06F 3/064* (2013.01); *G06F 3/065* (2013.01); *G06F 3/0611* (2013.01); *G06F 3/0655* (2013.01); *G06F 3/0679* (2013.01); *G06F 3/0688* (2013.01); *G06F 12/0246* (2013.01); *G06F 2212/7201* (2013.01)

(58) Field of Classification Search
None
See application file for complete search history.

(56) References Cited

U.S. PATENT DOCUMENTS

| 8,472,350 B2 | 6/2013 | Jagannathan et al. |
| 8,838,936 B1 | 9/2014 | Salessi et al. |
| 8,909,851 B2 | 12/2014 | Jones et al. |
| 2004/0076044 A1 | 4/2004 | Nowshadi |
| 2005/0138276 A1 | 6/2005 | Navada et al. |
| 2005/0024717 A1 | 10/2005 | Lin |

(Continued)

OTHER PUBLICATIONS

Allan, "Design Ware Technical Bulletin," retrieved from http://www.synopsys.com/home.aspx, Feb. 8, 2017, 9 pages.

(Continued)

*Primary Examiner* — Stephanie Wu

(74) *Attorney, Agent, or Firm* — Morgan, Lewis & Bockius LLP

(57) ABSTRACT

A memory system may include a volatile memory that is configured to store an address data structure that includes a plurality of logical-to-physical address entries. The address data structure may be stored across a plurality of bank groups of the volatile memory. A controller may be configured to store consecutive logical-to-physical address entries across different bank groups. In turn, during read and write operations for data sets associated with consecutive logical addresses, read requests for physical addresses where the data sets are stored may be sent to multiple bank groups and processed by the multiple banks in parallel.

18 Claims, 8 Drawing Sheets

(56) References Cited

U.S. PATENT DOCUMENTS

| | | |
|---|---|---|
| 2007/0019315 A1* | 1/2007 | Tamura ................ G06F 3/0611 |
| 2007/0022261 A1 | 1/2007 | Young |
| 2007/0288686 A1 | 12/2007 | Arcedera |
| 2010/0180072 A1* | 7/2010 | Kogita ................ G06F 12/0246 |
| | | 711/E12.008 |
| 2010/0257309 A1* | 10/2010 | Barsky ................ G06F 12/0246 |
| | | 711/E12.001 |
| 2011/0138100 A1 | 6/2011 | Sinclair |
| 2012/0011332 A1 | 1/2012 | Murakami |
| 2012/0054464 A1 | 3/2012 | Minne |
| 2013/0054928 A1* | 2/2013 | Im ...................... G06F 12/0246 |
| | | 711/170 |
| 2013/0148450 A1 | 6/2013 | Wu |
| 2014/0006683 A1 | 1/2014 | Ratn et al. |
| 2014/0082322 A1 | 3/2014 | Loh |
| 2015/0089164 A1 | 3/2015 | Ware |
| 2015/0095610 A1 | 4/2015 | Ben-Meir |
| 2015/0134933 A1 | 5/2015 | Holm |
| 2015/0347026 A1 | 12/2015 | Thomas |
| 2016/0342539 A1 | 11/2016 | Bains |
| 2017/0083438 A1 | 3/2017 | Han |
| 2017/0147499 A1 | 5/2017 | Mohan |
| 2018/0004420 A1 | 1/2018 | Jung |
| 2018/0024745 A1 | 1/2018 | Lee |
| 2018/0059950 A1 | 3/2018 | Gupta |

OTHER PUBLICATIONS

"Introduction to DDR4 Design and Test," retrieved from http://teledynelecroy.com/doc/introduction-to-ddr4-design-and-test, Apr. 15, 2013, 5 pages.

* cited by examiner

DISTRIBUTION OF LOGICAL-TO-PHYSICAL ADDRESS ENTRIES ACROSS MULTIPLE MEMORY AREAS

CROSS-REFERENCE TO RELATED APPLICATIONS

This application is a continuation of application Ser. No. 16/824,587, filed on Mar. 19, 2020, now U.S. Pat. No. 11,221,771, which is a continuation of application Ser. No. 15/641,708, filed on Jul. 5, 2017, now U.S. Pat. No. 10,635,331, the entirety of each of which is incorporated herein by reference for all purposes.

BACKGROUND

When a storage device receives a read request to read data from its non-volatile memory, the storage device may be configured to first identify where the data is stored in the non-volatile memory before the data can be read. To do so, the storage device may use an address directory system that includes addresses identifying where data is stored in the non-volatile memory. To save time, the storage device may load at least a portion of the address directory system into its volatile memory. When a read request is received, a controller of the storage device may access the address directory system in the volatile memory to identify where the data that is requested to be read is stored in the non-volatile memory. Although loading the address directory system into the volatile memory saves time compared to if the controller had to access the address directory system in the non-volatile memory every time a read request is received, accessing the volatile memory still takes some amount of time that contributes to the overall amount of time needed to complete a read request. Thus, ways to minimize the time needed to access the address directory system in the volatile memory in order to retrieve data in the non-volatile memory may be desirable.

BRIEF DESCRIPTION OF THE DRAWINGS

The accompanying drawings, which are incorporated in and constitute a part of this specification illustrate various aspects of the invention and together with the description, serve to explain its principles. Wherever convenient, the same reference numbers will be used throughout the drawings to refer to the same or like elements.

DETAILED DESCRIPTION

Overview

Figure 1A:
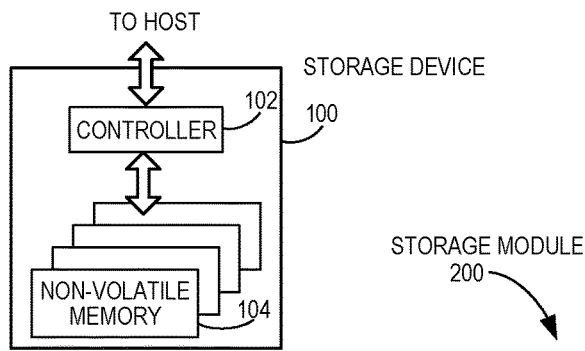
FIG. 1A is a block diagram of an exemplary storage device.

By way of introduction, the below embodiments relate to memory systems, devices, apparatuses, and methods for distributing logical-to-physical address entries across memory areas accessible via different interfaces. In one embodiment, a storage device includes a volatile memory and a controller. The volatile memory includes an address data structure memory area configured to store a plurality of logical-to-physical address entries of an address data structure. The address data structure includes a first portion accessible via a first interface and a second portion accessible via a second interface. Consecutively-addressed memory locations of the first portion and consecutively-addressed memory locations of the second portion are each configured to store non-consecutive logical-to-physical address entries of the address data structure. The controller is configured to read the logical-to-physical address entries to retrieve data sets from a non-volatile memory.

In some embodiments, no consecutive logical-to-physical address entries of the address data structure are stored in the first portion or the second portion.

In some embodiments, the address data structure memory area further includes a third portion comprising consecutively-addressed memory locations configured to store consecutive logical-to-physical address entries.

In some embodiments, the address data structure memory area includes an N-number of portions. The N-number of portions includes the first portion and the second portion, and each of the N-number of portions is accessible via a respective one of a plurality of interfaces. Additionally, every Nth logical-to-physical address entry is stored in a same one of the portions.

In some embodiments, each of the N-number of portions includes a respective one of a plurality of bank groups.

In some embodiments, each of the bank groups includes an M-number of a plurality of banks. Each bank is configured to store a different set of every (N×M)th logical-to-physical address entries.

In some embodiments, the volatile memory comprises synchronous dynamic random-access memory.

In another embodiment, a storage device includes a random-access memory and a controller. The random-access memory includes a first bank group and a second bank group. The controller is configured to store a first logical-to-physical address entry of an address data structure in a non-last memory location of the first bank group, where the first logical-to-physical address entry is associated with a first logical address. The controller is further configured to store a second logical-to-physical address entry of the address data structure in a non-last memory location of the second bank group, where the second logical-to-physical address entry associated with a second logical address. In addition, the first logical address and the second logical address are consecutive logical addresses.

In some embodiments, the controller is configured to store no pairs of consecutive logical-to-physical address entries of the address data structure in the first bank group.

In some embodiments, the controller is configured to store no pairs of consecutive logical-to-physical address entries of the address data structure in the second bank group.

In some embodiments, the random-access memory further includes a third bank group, and the controller is configured to consecutively store consecutive logical-to-physical address entries in consecutively-addressed memory locations of the third bank group.

In some embodiments, the address data structure memory area includes an N-number of bank groups. The N-number of bank groups includes the first bank group and the second bank group, and the controller is configured to store every Nth logical-to-physical address entry in a same one of the bank groups.

In some embodiments, each of the bank groups includes an M-number of a plurality of banks, and the controller is configured to store a different set of every (N×M)th logical-to-physical address entries in each of the banks.

In another embodiment, a storage device includes a memory and a controller. The memory includes a first memory area accessible via a first interface; and a second memory area accessible via a second interface. The controller is configured to receive at least one host request identifying consecutive logical addresses including a first logical address and a second logical address; and send, to the second memory, at least one access request associated with the first logical address and the second logical address. In response to receipt of the at least one access request: the first memory area is configured to perform a first access operation on a non-last memory location of the first memory area, where the first access operation associated with the first logical address, and the second memory is configured to perform a second access operation on a non-last memory location of the second memory area, where the second access operation associated with the second logical address.

In some embodiments, to perform the first access operation and the second access operation in response to receipt of the at least one access request: the first memory area is configured to retrieve a first physical address mapped to the first logical address from the non-last memory location of the first memory area and provide the first physical address to the controller; and the second memory area is configured to retrieve a second physical address mapped to the second logical address from the non-last memory location of the second memory area and provide the second physical address to the controller.

In some embodiments, to perform the first access operation and the second access operation in response to receipt of the at least one access request: the first memory area is configured to store a first logical-to-physical address entry associated with the first logical address into the non-last memory location of the first memory; and the second memory area is configured to store a second logical-to-physical address entry associated with the second logical address into the non-last memory location of the second memory area.

In some embodiments, the first memory area and the second memory are configured to store at least a portion of an address data structure that includes a plurality of logical-to-physical address entries, and no pairs of consecutive logical-to-physical address entries of the address data structure are stored in the first memory area or in the second memory area.

In some embodiments, the memory includes an N-number of memory areas, where the N-number of memory areas includes the first memory area and the second memory area. Each of the N-number of memory areas is accessible via a respective one of a plurality of interfaces, and where every Nth logical-to-physical address entry of an address data structure is stored in a same one of the memory areas.

In some embodiments, each memory area includes a respective one of a plurality of bank groups, and each bank group includes an M-number of a plurality of banks. Each bank is configured to store a different set of every (N×M)th logical-to-physical address entries of the address data structure.

In some embodiments, a second memory is configured to store a first data set at a first physical address mapped to the first logical address and a second data set at a second physical address mapped to the second logical address. The controller is configured to retrieve the first data set and the second data set from the second memory in response to performance of the first access operation in the first memory area of the first memory and performance of the second access operation in the second memory area of the first memory.

In another embodiment, a storage device includes: a memory comprising a first memory area accessible via a first interface and a second memory area accessible via a second interface; means for storing a first logical-to-physical address entry of an address data structure in a non-last memory location of the first bank group, the first logical-to-physical address entry associated with a first logical address; and means for storing a second logical-to-physical address entry of the address data structure in a non-last memory location of the second bank group, the second logical-to-physical address entry associated with a second logical address. The first logical address and the second logical address are consecutive logical addresses.

Other embodiments are possible, and each of the embodiments can be used alone or together in combination. Accordingly, various embodiments will now be described with reference to the attached drawings.

EMBODIMENTS

The following embodiments describe storage devices that distribute consecutive logical-to-physical address entries across different bank groups. Before turning to these and other embodiments, the following paragraphs provide a discussion of exemplary storage devices that can be used with these embodiments. Of course, these are just examples, and other suitable types of and/or storage devices can be used.

FIG. 1A is a block diagram illustrating a storage device 100. The storage device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host system and transmit command sequences for read, program, and erase operations to the non-volatile memory die(s) 104.

The controller 102 (which may be a flash memory controller) can take the form of processing circuitry, a micro-processor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the storage device 100 may be a card based system, such as a secure digital (SD) or a micro secure digital (micro-SD) card. In an alternate embodiment, the storage device 100 may be part of an embedded memory system.

Although in the example illustrated in FIG. 1A, the storage device 100 may include a single channel between the controller 102 and the non-volatile memory die(s) 104, the subject matter described herein is not limited to having a single memory channel. For example, in some NAND memory system architectures, 2, 4, 8 or more NAND channels may exist between the controller and the NAND memory die(s) 104, depending on controller capabilities. In any of the embodiments described herein, more than a single channel may exist between the controller and the memory die(s)s 104, even if a single channel is shown in the drawings.

Figure 1B:
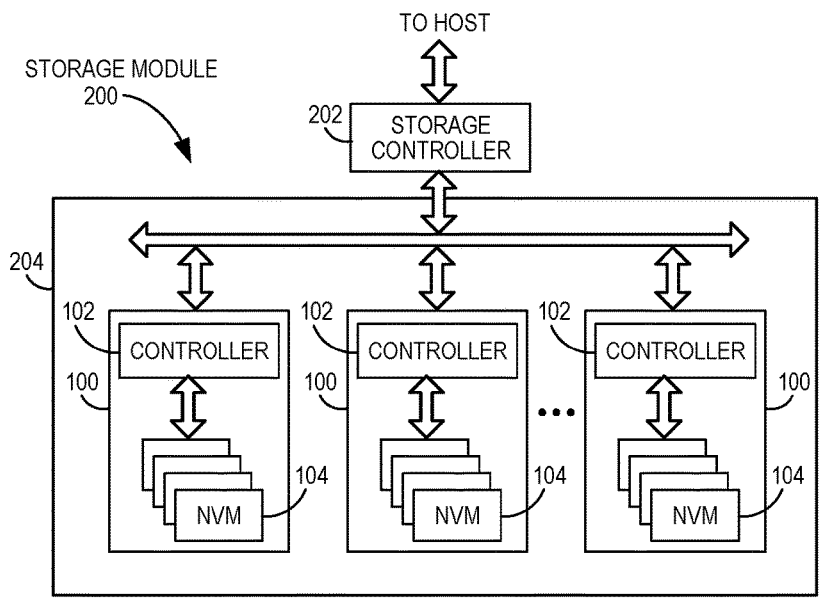
FIG. 1B is a block diagram of a storage module that includes a plurality of storage devices.

FIG. 1B illustrates a storage module 200 that includes plural storage devices 100. As such, the storage module 200 may include a storage controller 202 that interfaces with a host and with a storage system 204, which includes a plurality of storage devices 100. The interface between the storage controller 202 and storage devices 100 may be a bus interface, such as a serial advanced technology attachment (SATA), a peripheral component interface express (PCIe) interface, an embedded MultiMediaCard (eMMC) interface, a SD interface, or a Universal Serial Bus (USB) interface, as examples. The storage system 200, in one embodiment, may be a solid state drive (SSD), such as found in portable computing devices, such as laptop computers and tablet computers, and mobile phones.

Figure 1C:
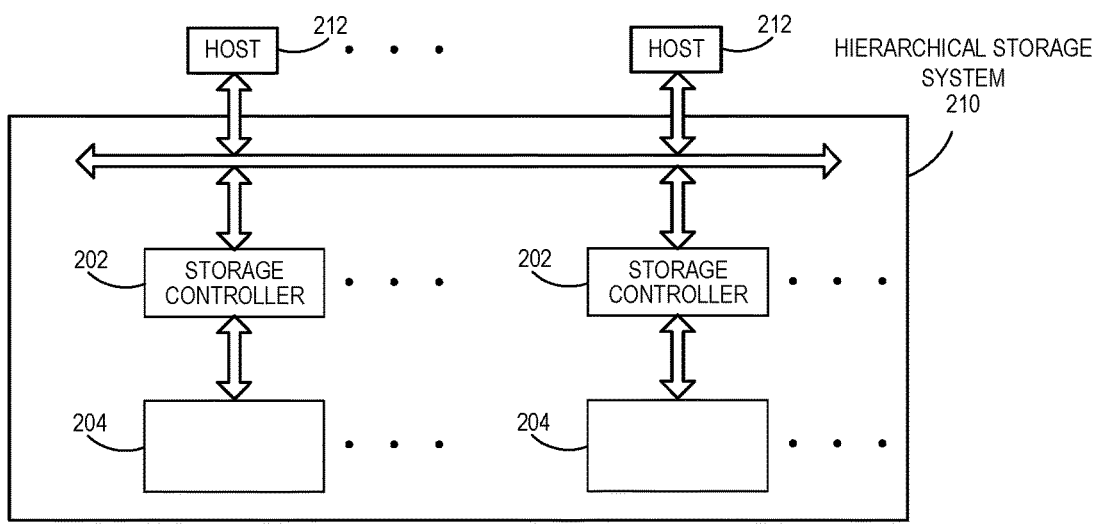
FIG. 1C is a block diagram of a hierarchical storage system.

FIG. 1C is a block diagram illustrating a hierarchical storage system 210. The hierarchical storage system 210 may include a plurality of storage controllers 202, each of which control a respective storage system 204. Host systems 212 may access memories within the hierarchical storage system 210 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the storage system 210 illustrated in FIG. 1C may be a rack mountable mass storage system that is accessible by multiple host computers, such as would be found in a data center or other location where mass storage is needed.

Figure 2A:
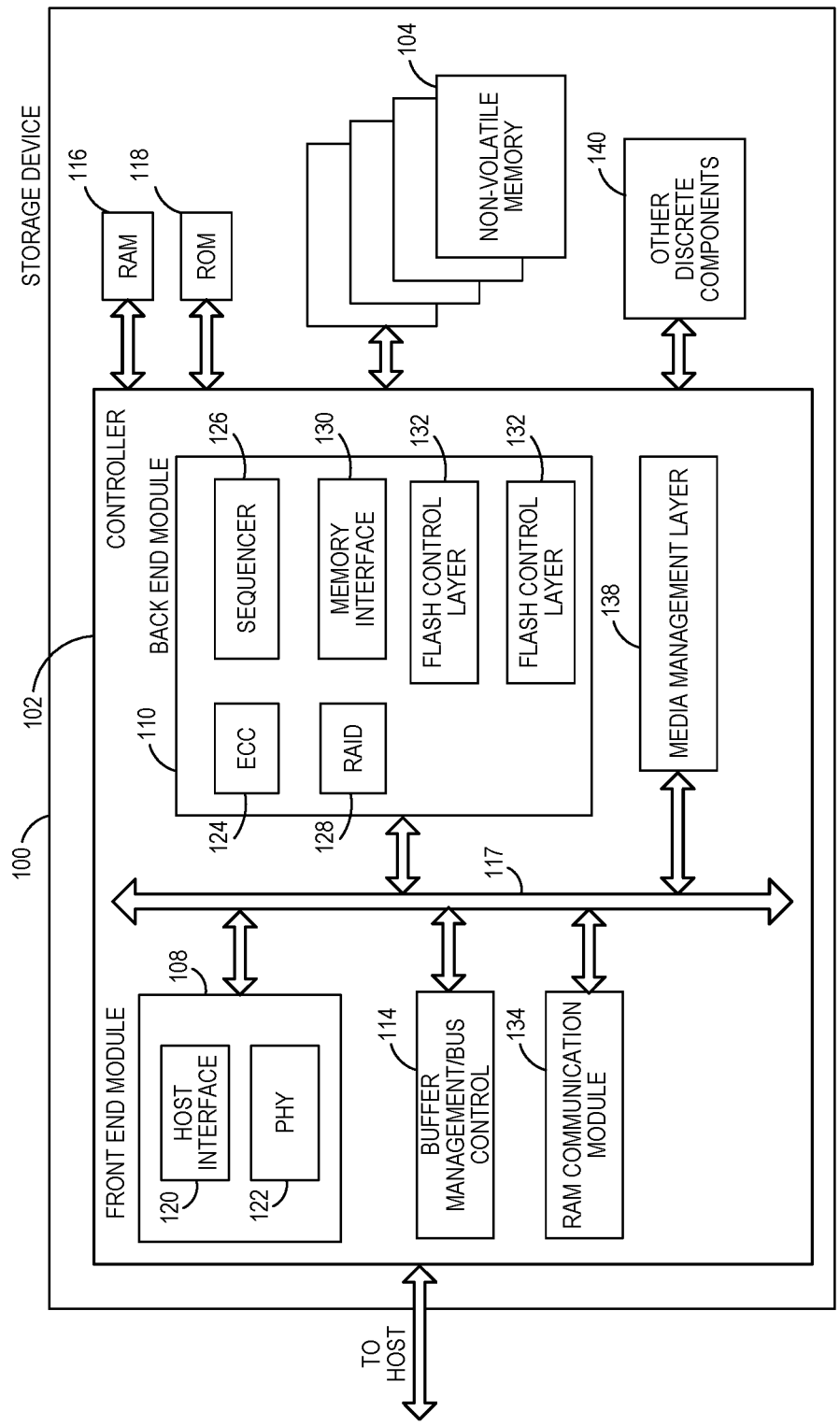
FIG. 2A is a block diagram of exemplary components of a controller of the storage device of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the storage device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus controller module 114 that manages buffers in a random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies.

The RAM 116 may be configured to perform various functions and/or be configured to store various types of information for the storage device 100 and/or for the controller 102 in particular. For example, the RAM 116 may be configured to store firmware that the controller 102 and/or its various modules may execute to perform the controller's various memory management functions. In addition, the RAM 116 may be configured to store information identifying a die layout of the memory dies 104, which may include but not limited to information identifying a number of the memory dies 104 in the storage device 100, information identifying one or more chip enable groups to which the memory dies 104 belong, and/or information identifying a metablock mapping that maps metablocks to the memory dies 104 and/or the dies' physical blocks. The RAM 116 may also be configured to store configuration files or information, including information that identifies: a die interleave scheme for programming data into the memory dies 104, a bad block list that that identifies which blocks are unusable, whether to enable wear leveling, whether to enable error correct (ECC), whether to enable on-chip or off-chip copying, types of garbage collection or other background operations to perform and/or capacities at which to perform them, folding parameters, delay parameters between commands being issued, and dynamic read voltage levels, as non-limiting examples.

In addition, the RAM 116 may be configured to temporarily store data that is read from the memory dies 104, including that data is read in response to host read requests and that is to be sent to a host to execute the host read request and/or data that is received from a host that is to be programmed into the memory dies 104. In addition or alternatively, the RAM 116 may be configured to store one or more address data structures that provide a mapping between host addresses maintained by a host device and physical address maintained by the storage device 100. Further description of storing an address data structure in the RAM 116 is described in further detail below.

In addition, the RAM 116 may have a physical or structural configuration (also referred to as a physical or structural arrangement or layout) and data stored in the RAM 116 may be addressed, stored, and accessed in accordance with the physical configuration. A particular physical configuration that the RAM 116 may have may depend on and/or correspond to a particular memory technology of the RAM 116, such as a particular dynamic random access memory (DRAM) or a particular static random access memory (SRAM) technology.

Figure 3:
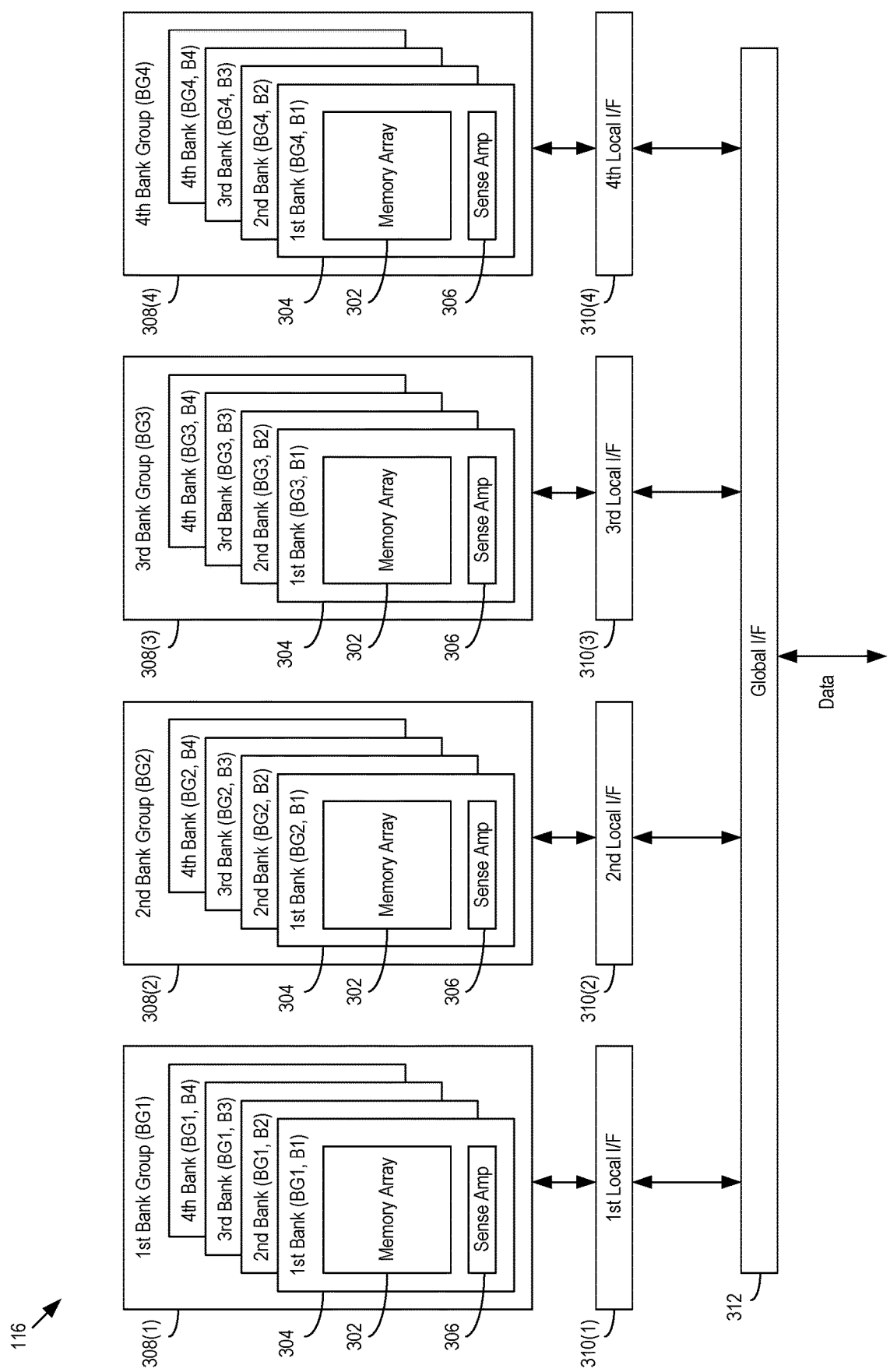
FIG. 3 is a block diagram of an example physical configuration of a random-access memory component of the storage device of FIGS. 1A-2B.

FIG. 3 shows a block diagram of an example physical configuration of the RAM 116. The physical configuration shown in FIG. 3 may be an example configuration of double data rate fourth generation (DDR4) synchronous dynamic random-access memory (SDRAM), although other memory technologies for which the physical configuration shown in FIG. 3 may be possible. Memory elements in the RAM 116 may be organized into a plurality of memory arrays 302, with each memory array 302 being included in a bank 304. That is, the RAM 116 may include a plurality of banks 304, with each bank 304 including a respective one of the plurality of memory arrays 302. Each bank 304 may further include sense amplifier (amp) circuitry 306 to sense data from and program data into an associated memory array 302. Other circuitry located on a bank 304 may be possible.

The plurality of banks 304 may be organized or arranged into sets or bank groups 308. Otherwise stated, the RAM 116 may include a plurality of bank groups 308, with each bank group including one or more banks 304. In the example physical configuration shown in FIG. 3, the RAM 116 includes four bank groups 308, including g a first bank group (BG1) 308(1), a second bank group (BG2) 308(2), a third bank group (BG3) 308(3), and a fourth bank group (BG4) 308(4). However, the physical configuration shown in FIG. 3 is merely an example, and other example physical configurations of the RAM 116 may include more or fewer than four bank groups 308.

Also, in the example physical configuration in FIG. 3, each of the bank groups 308 is shown as including four banks. For example, the first bank group 308(1) includes a first bank (BG1, B1), a second bank (BG1, B2), a third bank (BG1, B3), and a fourth bank (BG1, B4). The banks in the other bank groups are similarly labeled in FIG. 3. Again, the physical configuration in FIG. 3 is merely an example, and in other example physical configurations, each bank group (BG) may include more or fewer than four banks. Also, for some example physical configurations, the number of banks 304 among the bank groups 308 may be the same. For example, in FIG. 3, each bank group 308 includes four banks. In other example configurations, the numbers of banks 304 among the bank groups 308 may vary such that at least two bank groups 308 may have different numbers of banks 304. Various configurations for the numbers of bank groups and the numbers of banks in each of the bank groups may be possible.

In addition, as shown in FIG. 3, each bank group 308 may be associated with a respective one of a plurality of local interfaces (I/F) or gating circuits 310. For example, the first bank group 308(1) may be associated with a first local interface 310(1), the second bank group 308(2) may be associated with a second local interface 310(2), the third bank group 308(3) may be associated with a third local interface 310(3), and the fourth bank group 308(4) may be associated with a fourth local interface 310(4). Each local interface or gating circuit 310 may be configured to communicate, including being configured to route, data to and from a particular bank 304 of the bank group 308 with which it is associated. Otherwise stated, access to a particular bank group 308 may be made through its associated local interface 310, and banks 304 that are part of the same bank group 308 share the same local interface. To illustrate, the first local interface 310(1) may be configured to communicate data to and from the first, second, third, and fourth banks of the first bank group 308(1). Otherwise stated, data to be written into or read from a bank in the first bank group may be communicated through the first local interface 310(1), and not through any of the other local interfaces 310(2), 310(3), 310(4).

In addition, the physical configuration of the RAM 116 may include a global interface or gating circuit 312 electrically coupled to each of the local interfaces 312. Data communicated between the bank groups 308 and a module of the storage device 100 external to the RAM 116 may be communicated through the global interface 312. That is, in order for data to be communicated from a given ith bank group BG(i) to external the RAM 116, the data may be communicated through the associated ith local interface 310(i) and then through the global interface 312. Similarly, data external to the RAM 116 to be stored in a bank 304 of an ith bank group BG(i) may be communicated to the global interface 312, and the global interface 312 may be configured to route the data to the appropriate ith local interface 310(i), which may communicate the data to the bank of the ith bank group BG(i) where the data is to be stored. Each of the local interfaces 310 and the global interface 312 may each be configured with suitable circuitry to perform their respective functions, such as multiplexers and/or switches as examples.

Referring also to FIG. 2A, a RAM communication module 134 may be configured to communicate with the RAM 116, such as by sending access requests to the RAM 116. As used herein, a RAM access request is a request for an action to be performed on one or more banks 304 within a bank group 308 of the RAM 116. A RAM access operation may be an operation performed on one or more banks 304 in response to a RAM access request. Non-limiting example access requests are RAM read requests, RAM write (program) requests, and RAM erase requests, and example RAM access operations are RAM read, write, and program operations. The RAM 134 is shown as being a component within the controller 102 that is separate from the other components. However, in other example configurations, the RAM communication module 134 may be a sub-component of one or more of the other modules of the storage device 100, such as the back end module 110 and/or the flash control layer 132, as non-limiting examples. In this context, the RAM communication module 134 may be a standalone module or component of the storage device 100 that communicates with the RAM 116 on its own initiative and/or on behalf of another module or component of the storage device 100, may be a communication sub-component of another module or component of the storage device 100, or a combination thereof.

For the example physical configuration shown in FIG. 3, the RAM 116 may be configured to perform two access requests, each request for a different bank group 308, faster than it can perform the same two access requests for the same bank group 308. To illustrate, suppose the RAM communication module issues two read requests to the RAM 116 to read two data sets from one or more banks of the same, first bank group 308(1). The read requests may be routed to the first bank group 308(1) via the global interface 312 and the first local interface 310(1). The first bank group 308(1) may handle the read requests in a generally sequentially manner such that the two data sets are sequentially provided from the first bank group 308(1) through the first local interface 310(1) and through the global interface 312 to the requesting component. Alternatively, suppose the two read requests are for two data sets stored in different bank groups. For example, suppose the first data set is stored in the first bank group 308(1) and the second data set is stored in the second bank group 308(2). The two different bank groups 308(1), 308(2) may be able to handle the read requests and send the first and second data sets to their respective local interfaces 310(1), 310(2) in a generally parallel manner. In general, due to the parallel configuration of the bank groups 308, the RAM 116 may be configured to handle or execute multiple access requests faster where those requests pertain to actions performed in different bank groups compared to if they pertain to actions performed in the same bank group. For some example configurations, the increase in speed may be on the order of 33-50%.

Referring back to FIG. 2A, the front end module 108 may include a host interface 120 and a physical layer interface (PHY) 122 that provide the electrical interface with the host or next level storage controller. The choice of the type of the host interface 120 can depend on the type of memory being used. Example types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction code (ECC) engine or module 124 that encodes the data bytes received from the host, and decodes and error corrects the data bytes read from the non-volatile memory 104. The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the storage device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, 800 interface (or higher). A control layer 132 may control the overall operation of the back end module 110.

Additional modules of the storage device 100 illustrated in FIG. 2A may include a media management layer 138, which performs wear leveling of memory cells of the non-volatile memory die 104, address management, and facilitates folding operations as non-limiting examples. The storage device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Figure 2B:
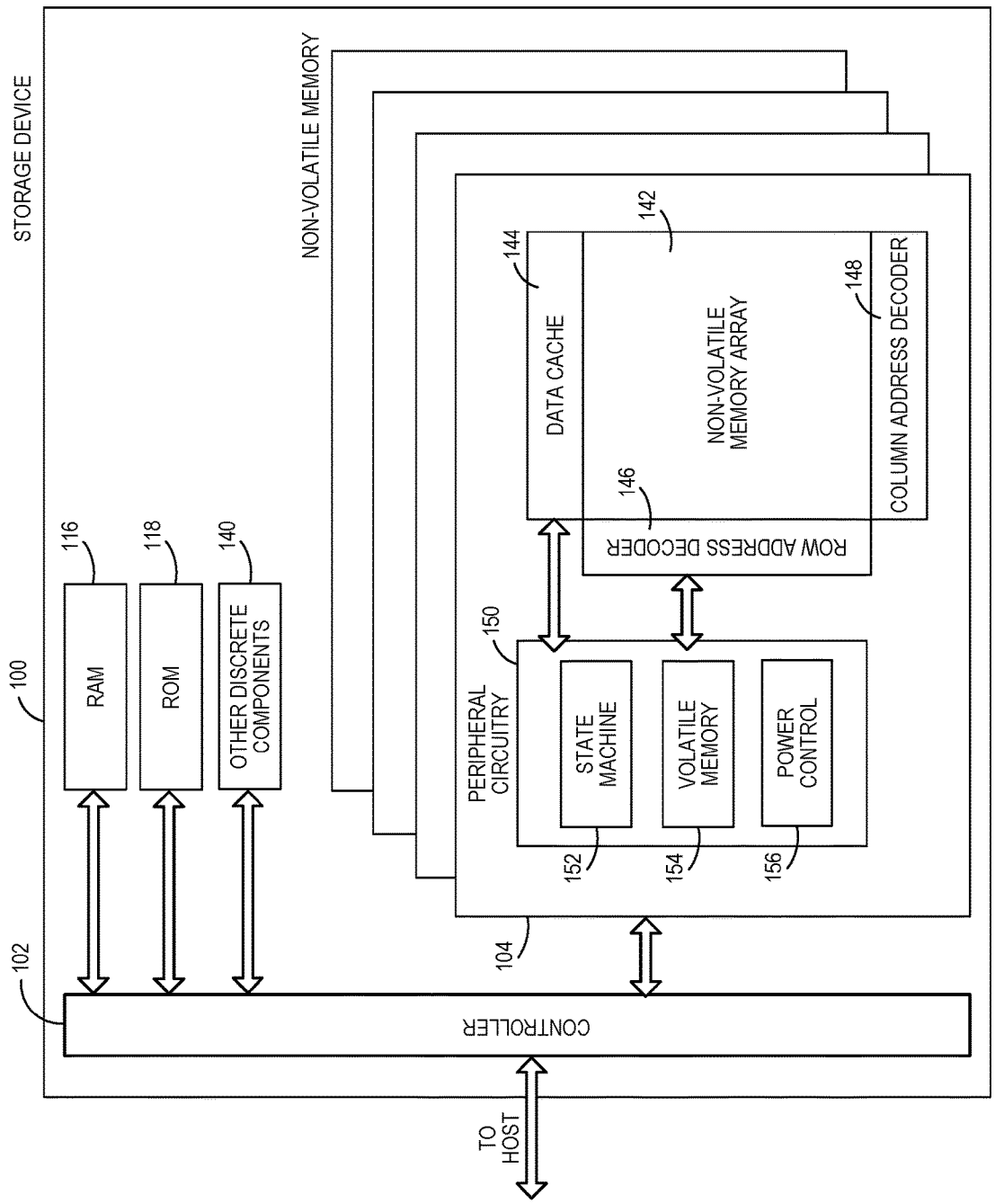
FIG. 2B is a block diagram of exemplary components of a non-volatile memory die of the storage device of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured or programmed as single-level cells (SLCs) that store a single bit of data per cell, multi-level cells (MLCs) that store multiple bits of data per cell, or combinations thereof. Example multi-level cells may be configured or programmed to store 2-bits per cell, 3-bits per cell, 4-bits per cell, or more.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a memory cell (e.g., a FGT). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

Figure 4:
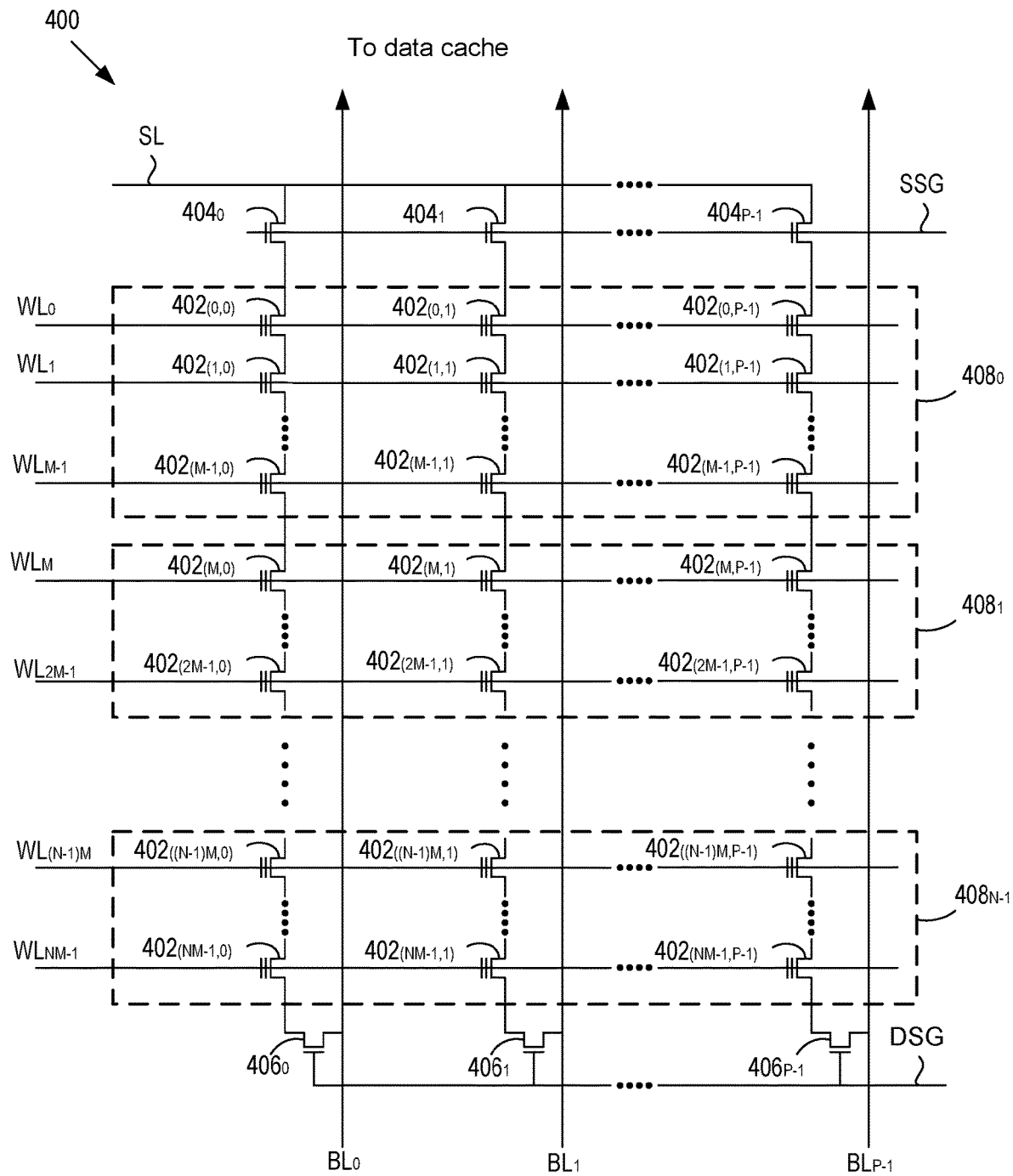
FIG. 4 is a circuit schematic diagram of an exemplary NAND-type flash memory array.

FIG. 4 is a circuit schematic diagram of at least a portion of an exemplary NAND-type flash memory array 400, which may be representative of at least a portion of the memory array 142. The memory array portion 400 may include a P-number of series-connected strings of (N times M) FGTs, each coupled to one of a P-number of bitlines $BL_1$ to $BL_{P-1}$, where N is the number of blocks $408_0$ to $408_{N-1}$ in the memory array 400, and M is the number of pages of FGTs coupled to wordlines WL in each of the N-number of blocks $408_0$ to $408_{N-1}$.

To sense data from the FGTs, a page of FGTs and a corresponding wordline may be selected, and current sensing of bitlines may be employed to determine whether a floating gate of a FGT in the selected page contains charge or not. Current that flows through a string may flow from a source line SL, through the string, to a bitline BL to which the string is coupled. The string may be coupled to the source line SL via a source select transistor, and may be coupled to its associated bitline BL via a drain select transistor. For example, a first string of FGTs $402_{(0,0)}$ to $402_{(NM-1,0)}$ may be coupled to the source line SL via a source select transistor $404_0$ that is connected to the source line SL, and may be coupled to its associated bitline $BL_0$ via a drain select transistor $406_0$. The other strings may be similarly coupled. Switching of source select transistors $404_0$, $404_1$, ..., $404_{P-1}$ may be controlled using a source select gate bias line SSG that supplies a source select gate bias voltage $V_{SSG}$ to turn on an off the source select transistors $404_0$, $404_1$, ..., $404_{P-1}$. Additionally, switching of drain select transistors $406_0$, $406_1$, ..., $406_{P-1}$ may be controlled using a drain select gate bias line DSG that supplies a drain select gate bias voltage $V_{DSG}$ to turn on and off the drain select transistors $406_0$, $406_1$, ..., $406_{P-1}$.

To program a memory cell, a program voltage is applied to the control gate of the memory cell, and the bitline BL associated with the memory cell is grounded. Electrons from the channel are injected into the floating gate of the memory cell. Doing so may cause electrons to accumulate in the floating gate, which in turn may cause the floating gate to become negatively charged and the threshold voltage of the memory cell to be raised. To apply the program voltage to the control gate of the memory cell being programmed, the program voltage is applied on the wordline WL to which the memory cell is coupled. Application of the program voltage may include applying a series or sequence of programming voltage pulses to the control gate of the memory cell being programmed via the wordline WL. In some example configurations, the series of programming voltage pulses may have increasing magnitudes, starting with an initial pulse of the series having an initial program voltage magnitude. As discussed above, one memory cell in each of the strings share the same wordline WL.

The flash memory described with reference to FIG. 4 is a non-limiting example and other configurations of the flash memory array 142 and/or other types of memory technology for the memory array 142 and/or a memory die as a whole may be possible. Further details of the various types of memory that may be used for the memory die 104 and/or the memory array 142 may be possible.

Referring back to FIG. 2B, the non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 152 that provides status information to the controller 102 as well as provide chip-level control of memory operations. The peripheral circuitry 150 may also include volatile memory 154. An example configuration of the volatile memory 154 may include latches, although other configurations are possible.

In addition, the peripheral circuitry 150 may include power control circuitry 156 that is configured to generate and supply voltages to the memory array 142, including voltages (including program voltage pulses) to the wordlines, erase voltages (including erase voltage pulses), the source select gate bias voltage $V_{SSG}$ to the source select gate bias line SSG, the drain select gate bias voltage $V_{DSG}$ to the drain select gate bias line DSG, as well as other voltages that may be supplied to the memory array 142. In one example configuration, the power control circuitry may include charge pumps to generate the voltages, although other configurations may be possible.

Figure 5:
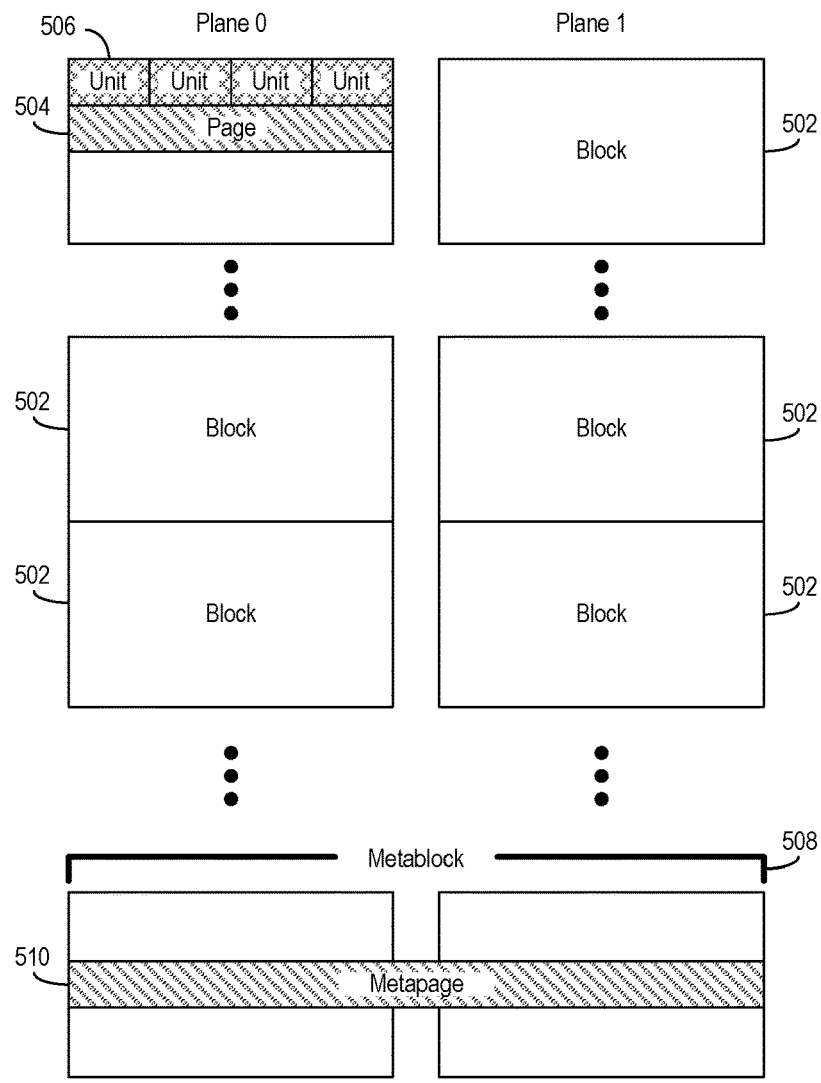
FIG. 5 is a block diagram of an example organizational arrangement or hierarchy of a memory array for flash memory.

Referring to FIG. 5, the memory array 142 and/or a plurality of memory arrays 142 spanning multiple memory dies 104 may have an organizational arrangement or hierarchy under which memory elements or cells of the memory array 142 and/or multiple memory arrays 142 of multiple memory dies 104 may be organized. The controller 102 may be configured to store and access data in accordance with the organizational arrangement or hierarchy.

FIG. 5 is a block diagram of an example organizational arrangement or hierarchy of a memory array 142 for flash memory. As mentioned, for flash memory, the memory cells may be divided or organized into blocks 502, and each block 502 may further be divided into a number of pages 504. Each block 502 may contain the minimum number of memory elements that may be erased together. In addition, each page 504 may be a unit of sensing in the memory array 142. Each individual page 504 may further be divided into segments or units 506, with each segment or unit 506 containing the fewest number of memory cells that may be written to at one time as a basic programming operation. Data stored in a segment or unit of memory cells—referred to as a flash memory unit (FMU), an ECC page, or a codeword—may contain the amount of data that is written at one time during a basic programming operation and/or the amount of data that can be encoded or decoded by the ECC engine 124 during a single encoding or decoding operation. The pages 504 may be divided into the same number of segments or units. Example numbers of segments or unit may be four or eight, although other numbers are possible. In general, data may be stored in blocks and pages of memory elements non-contiguously (randomly) or contiguously.

In addition, the organizational arrangement or hierarchy may include one or more planes in which each of the blocks 502 may be configured. Generally, a plane includes a "column" of blocks 502, although other configurations may be possible. A single memory array 142 may include a single plane or multiple planes. The example arrangement shown in FIG. 5 includes two planes, Plane 0 and Plane 1. Data stored in different planes may be sensed simultaneously or independently.

Additionally, the organizational arrangement or hierarchy may include metablocks 508 and metapages 510. A metablock address or number identifying a metablock may be mapped to and/or correspond to a logical address (e.g., a logical group number) provided by a host. A metablock 508 and a metapage 510 may span or be distributed across a respective single block and page in a single plane, or alternatively, may span or be distributed across respective multiple blocks and multiple pages across multiple planes. FIG. 5 shows the metablock 508 and the metapage 510 spanning across two planes, Plane 0 and Plane 1. Depending on the organizational arrangement, metablocks 508 and metapages 510 spanning across multiple planes may span across only those planes of a single memory die 104, or alternatively may span across multiple planes located of multiple memory dies 104.

Referring back to FIG. 2A, a host and the storage device 100 may use different addressing schemes for managing the storage of data. For example, when a host wants to write data to the storage device 100, the host may assign a host or logical address (also referred to as a logical block address (LBA)) to the data. Similarly, when the host wants to read data from the storage device 100, the host may identify the data it wants read by the logical address. The host may utilize a host or logical addressing scheme in which a host file system maintains a logical address range for all LBAs assigned or recognized by the host. The logical addresses (LBAs) may be grouped into logical groups (LGs), which may further be divided or organized into units of logical sectors. For some examples, host read and write requests may be requests to read and write a segment comprising a string of logical sectors of data with contiguous addresses.

In contrast to the host's logical addressing scheme, the storage device 100, as previously described, may store and access data according to one or more physical addressing schemes that use physical addresses different from the logical addresses assigned by the host to store and access data. To coordinate the host's logical addressing with the non-volatile memory system's physical addressing, the media management layer 138 may map logical addresses to physical addresses in the form of logical-to-physical mappings for storage or retrieval of data. As described in further detail below, the logical-to-physical mappings may be included in logical-to-physical entries organized in one or more address data structures (e.g., tables). The address data structures may be stored in the memory dies 104 and/or loaded into the RAM 116 during operation of the storage device 100. The RAM communication module 134 may be configured to access the RAM 116 to access the logical-to-physical mappings.

In some example configurations, the storage device 100 may maintain two physical addressing schemes, an actual physical addressing scheme and an abstract physical addressing scheme. For some of these example configurations, direct mappings between the host logical addresses and the abstract physical addresses (rather than the actual physical addresses) may be maintained, and the media management layer 138, or another module, may be configured to convert the abstract physical addresses to the actual physical addresses. In this way, logical groups and logical sectors of a logical group may be mapped or correspond to metablocks and physical sectors of a metablock.

Figure 6:
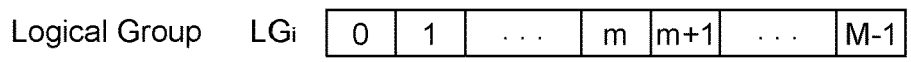
FIG. 6 is a schematic diagram of an example mapping between logical groups and metablocks.
Figure 6:
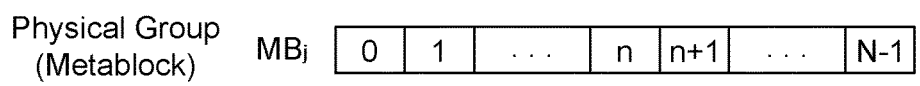
Figure 6:
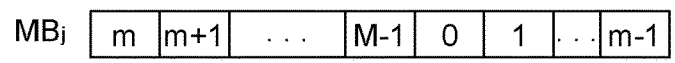

FIG. 6 shows a schematic diagram of an example mapping between an i-th logical groups ($LG_i$) and a j-th metablock ($MB_j$). A logical group may have an M-number of logical group sectors, and a metablock may have an N-number of physical sectors. In some example configurations, M and N may be the same such that there is a one-to-one correspondence between the logical sectors and the physical sectors, and one metablock of storage may store one logical group of data. In other example configurations, N may be greater than M such that multiple logical groups may correspond to a single metablock and one metablock of memory may store two or more logical groups of data.

Additionally, in some instances, the logical sectors of data may be stored in the physical sectors of memory in contiguous and sequential logical order, while in other instances, N logical sectors of data may be stored randomly or discontiguously in the physical sectors of a metablock. In addition, in some instances where data is stored contiguously, there may be an offset between the lowest address of a logical group and the lowest address of the metablock to which it is mapped. In that case, logical sector addresses may wrap around as a loop from the bottom back to the top of the logical group within the metablock. For example, as shown in the bottom diagram of FIG. 5, and assuming M and N are the same, a metablock $MB_j$ may store data associated with a logical sector m in its first physical sector 0. When the last logical sector M−1 is reached, the logical sectors may wrap around such that the first logical sector 0 is stored contiguously and sequentially after logical sector 0, and the logical sector m−1 is stored in the last physical sector N−1. A page tag may be used to identify any offset, such as by identifying the starting logical sector address of the data stored in the first physical sector of the metablock.

In other example configurations, the storage device 100 may maintain only a single physical addressing scheme and/or directly map the host logical address to the actual physical addresses rather than the abstract physical addresses. Hereafter, for purposes of the present description, and unless expressly described otherwise, no distinction is made between abstract physical addresses and actual physical addresses, and they are collectively referred to herein as physical addresses.

In order to keep track of where in the storage device 100 data is stored, the storage device 100 may maintain and manage an address mapping directory system that includes logical-to-physical address mappings that map relationships or associations between logical addresses and physical addresses. The address mapping directory system may include one or more address mapping data structures (such as tables, listings, logs, or databases as examples) that include the logical-to-physical address mappings to track and identify the logical-physical address relationships or mappings.

The address mapping directory system may be configured in various ways to track or identify where data is stored. For example, the address mapping directory system may include a primary address data structure (also referred to as a Group Address Table (GAT)) that provides a primary set of entries that include logical-to-physical address mappings for logical addresses included in the logical address range recognized by the host system 101. Various configurations of the mapping for the GAT are possible. In one example configuration for flash technology, the GAT keeps track of logicalto-physical address mappings between logical groups of logical sectors and corresponding metablocks. The GAT includes an entry for each logical group or logical block address (LBA). For some example configurations, the GAT may be organized into a plurality of GAT pages, with each GAT page including entries identifying a metablock address for every logical group.

In addition, for some example configurations, the address mapping directory system and/or its address data structures may include at least one secondary address data structure in addition to the GAT. The at least one secondary address data structure may provide logical-to-physical address mapping for data fragments, may track changes or updates to where data is stored, or some combination thereof. One example secondary address data structure, referred to as GAT Delta, may track changes to entries and/or include a listing of changed entries in the mappings of the GAT. When data is re-written, the new version of the data may be written to another part of the storage device 100, such as in an update block. GAT Delta may map data stored in the update blocks with associated logical groups. Other secondary address data structures may be possible. Other example directory systems may utilize a single address data structure.

The address mapping directory system may be stored in a portion of the memory dies 104. During an initialization phase of storage device 100, at least a portion of the address mapping directory system may be copied into the RAM 116. Hereafter, for simplicity and unless specified otherwise, the portion of the address mapping directory system that is copied into the RAM 116, and managed, maintained, and/or updated in the RAM 116, is referred to as a RAM address data structure. Also, as used herein, a logical-to-physical address mapping that maps a logical address to a physical address may be included in an entry of the RAM address data structure. That is, an entry of the RAM address data structure includes or is populated with a logical-to-physical address mapping.

Figure 7:
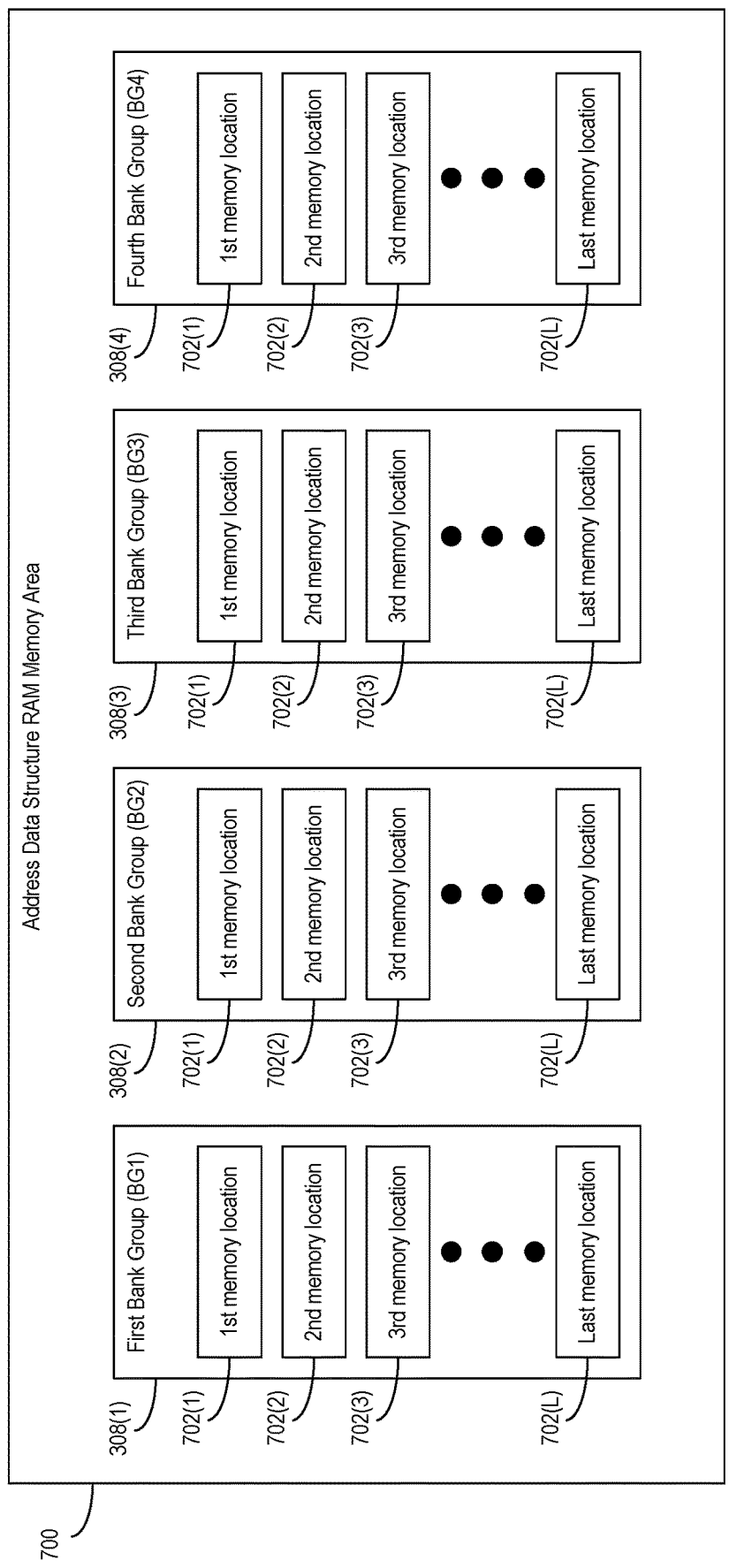
FIG. 7 is a schematic diagram of an example address data structure memory area of the random-access memory component of the storage device of FIGS. 1A-2B being implemented with the physical configuration of the random-access memory component shown in FIG. 3.

FIG. 7 shows a schematic diagram of an address data structure RAM memory area 700 of the RAM 116 in which the address data structure may be stored. As shown in FIG. 7, the address data structure RAM memory area 700 may extend across multiple bank groups 308 of the RAM 116. In some example configurations, as shown in FIG. 7, the address data structure RAM memory area 700 may extend or expand across all of the bank groups 308 of the RAM 116. In other example configurations, the address data structure RAM memory area 700 may extend or expand across more than one but less than all of the bank groups 308 of the RAM 116. That is, the address data structure RAM memory area 700 may extend or expand over at least two bank groups 308. By extending or expanding over multiple bank groups 308, the address data structure RAM memory area 700 may include a plurality of portions, with each portion being accessible via a respective one of the plurality of local interfaces 310.

In addition, the address data structure RAM memory area 700 may include a plurality of memory locations 702. As shown in FIG. 7, the plurality of memory locations 702 may be arranged or organized into the plurality of bank groups 308. That is, each bank group 308 over which the address data structure RAM memory area 700 extends may include an associated set of memory locations 702. Each memory location 702 may include a plurality of memory cells or elements, with each memory cell or element configured to store a bit of data.

Each set in a bank group 308 may include a first memory location and extend to a last memory location. Within a single bank group 308, the set extending from the first memory location 702(1) to the last memory location 702(L) may extend over a single bank or a plurality of banks. The number of memory locations 702 in each set and/or in each bank group may be the same or different among the various bank groups 308.

In addition, each bank group may include a total number of memory locations. In particular, each bank of a bank group may include a respective number of memory locations, and the total number of memory locations of a bank group may be the sum of the number of memory locations in the banks of the bank group. The number of the memory locations 702 in a set—i.e., the number of the memory locations 702 of a particular bank group that are within the address data structure RAM memory area 700—may be all of the memory locations of the bank group or less than all of the memory locations of the particular bank group. In other words, a total capacity of a particular bank group may or may not be larger than a capacity of the particular bank group defined by the set of memory locations extending from the first memory location 702(1) to the last memory location 702(L).

Each memory location 702 may have an associated unique RAM address or other RAM identifier. A unique RAM address for a particular memory location may include any of various information that uniquely identifies or distinguishes the particular memory location from the other memory locations. For example, a unique RAM address for a particular memory location may identify a particular bank group and a particular bank within the bank group in which the particular memory location is located. In addition, the RAM address for a particular memory location may include information that uniquely identifies or distinguishes the particular memory location from other memory locations in the same bank. For example, the unique RAM address may an address range identifier that identifies a memory cell range of the memory cells of the particular memory location, a starting address that identifies a starting memory cell or a starting group of memory cells of the particular memory location, an end address that identifies an end memory cell or an end group of memory cells of the particular memory location, an address size that identifies a size or storage capacity of the particular memory location, or a combination thereof.

In addition, a RAM address may be formatted in various ways in order to represent the various information included in and/or that makes up the RAM address. For example, a RAM address may be formatted into various address portion (otherwise referred to as an address component or an address field), with portion indicating a certain piece of information of the RAM address. For example, a RAM address for a particular memory location may include a first portion that identifies a bank group in which the particular memory location is located, a second portion that identifies a bank in which the particular memory location is located, and a third portion including information that distinguishes the particular memory location from the other memory locations in the bank. Also, the third portion itself may be separated or organized into various portions to identify various pieces of information that may be used to uniquely identify or distinguish the particular memory location from the other memory locations of the same bank.

In addition, a RAM address and/or its particular portions may be represented by any of various types of characters such as letters, numbers (or numerical digits), punctuations, other types symbols, or a combination thereof. However a RAM address is represented, it may include information from which positionings of RAM addresses relative to each other in a sequence can be derived. For example, RAM addresses that are purely numerical can be positioned in a sequence relative to each other based on the aspect of numbers being greater than and less than each other. In a similar fashion, RAM address that include letters can be positioned in a sequence relative to each other based on the letters being part of an alphabet with a predefined or predetermined order.

A set of memory locations 702 of a bank group 308 may provide a range of RAM addresses. The range may be bounded by a first bound and a second bound. The first bound may be the RAM address of the first memory location 702(1) and the second bound may be the RAM address of the last memory location 702(L).

The RAM addresses of a range may form a sequence of RAM addresses, starting with the RAM address of the first memory location 702(1) and ending with the RAM address of the last memory location 702(L). The sequence may have a sequential order that determines the relative positioning of the RAM addresses in the sequence. The sequential order may be defined by an aspect that can be derived from a characteristic of the RAM addresses of a range and/or the way in which the RAM addresses are formatted or represented. For example, in a configuration where the RAM addresses are numerical, and since numbers are greater than and less than each other, the sequential order may be that the RAM addresses in the sequence continually increase in numerical value or continually decrease in numerical value, starting with the RAM address of the first memory location 702(1) and ending with the RAM address of the last memory location 702(L). To expand, where the RAM addresses of the sequence continually increase, the memory location of the first memory location 702(1) may have the lowest RAM address of the range, the memory location of the last memory location 702(L) may have the highest RAM address of the range, and the RAM addresses between the first and last RAM address may continually increase. Alternatively, where the RAM addresses of the sequence continually decrease, the memory location of the first memory location 702(1) may have the highest RAM address of the range, the memory location of the last memory location 702(L) may have the lowest RAM address of the range, and the RAM addresses between the first and last RAM addresses may continually decrease. Other ways that RAM addresses of a range can be ordered in a sequence, including those ways that represent RAM addresses with characters other than or in addition to numerical digits, may be possible.

As used herein, RAM addresses occurring consecutively in the sequence are referred to as consecutive RAM addresses. Conversely, RAM addresses occurring non-consecutively in the sequence are referred to as non-consecutive RAM addresses. Also, memory locations 702 that have consecutive RAM addresses are referred to as consecutive memory locations or consecutively-addressed memory locations, and memory locations 702 that have non-consecutive RAM addresses are referred to as non-consecutive memory locations or non-consecutively-addressed memory locations.

In addition, each memory location 702 may be configured to store a logical-to-physical address entry of the RAM address data structure. Accordingly, for a given logical-to-physical address entry stored in a given memory location 702, the given logical-to-physical address entry may be stored in the address data structure RAM memory area 700 at the RAM address of the given memory location 702 that is storing the given logical-to-physical address entry. As used herein, a RAM address associated with a given logical-to-physical address entry may be the RAM address of the given memory location 702 that is configured to store or storing the given logical-to-physical address entry.

As previously described, each logical-to-physical address entry may include a logical-to-physical address mapping that maps a logical address to a physical address. A logical address of a logical-to-physical mapping may be a logical block address (LBA) or a logical group (LG) number that may be included or identified in a host write request to write data to and/or a host read request to read data from the memory dies 104. A physical address of a logical-to-physical address mapping may identify a memory location in the memory dies 104 where an associated data set is stored.

Referring also to FIG. 2A, the controller 102 may be configured to use the address data structure loaded in the address data structure RAM memory area 700 to execute read and write requests received from a host device. With respect to read requests, when the storage device 100 receives, from a host device, a host read request to read a data set from the memory dies 104, the host read request may include a logical address that identifies, from the host device's perspective, where the data set that the host device wants read is stored in the memory device. Using the logical address, the controller 102 may be configured to identify the associated physical address that identifies the physical location in the memory dies 104 where the data set is stored. To do so, the controller 102 may use the address data structure stored in the address data structure RAM memory area 700.

In further detail, when the controller 102, such as with the front end module 108, receives a host read request that includes a logical address, the RAM communication module 134 may be configured to use the logical address to identify a RAM address identifying the physical location where an associated logical-to-physical address entry in the address data structure RAM memory area 700 is stored. As used herein, a logical-to-physical address entry is associated with a logical address identified in a host read request if the logical address identified in the logical-to-physical address entry matches the logical address identified in the host read request.

Figure 8:
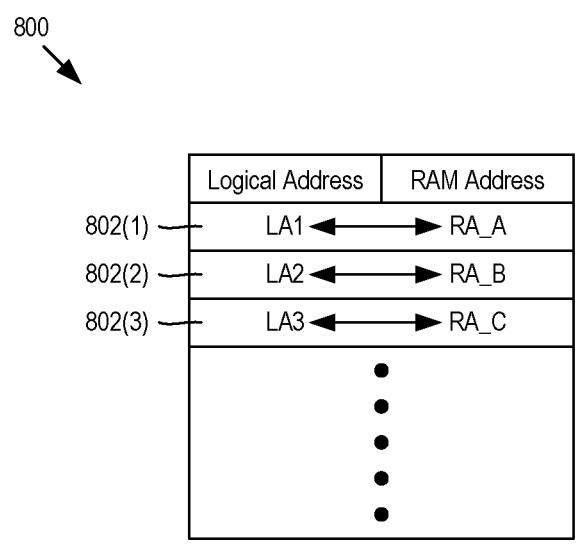
FIG. 8 is a schematic diagram of an example table configured to provide mappings of logical addresses and RAM addresses.

Referring to FIG. 8, for some example configurations, the RAM communication module 134 may be configured to access a table or other data structure 800, which may also be stored in the RAM 116, that maps or associates logical addresses with RAM addresses of the address data structure RAM memory area 700. For example, as shown in FIG. 8, the table 800 may include a plurality of entries 802, with each entry mapping a logical address (LA) to a RAM address (RA). FIG. 8 shows a first entry 802(1) that includes a first logical address LA1 mapped to a RAM address RA_A, a second entry 802(2) that includes a second logical address LA2 mapped to a RAM address RA_B, a third entry 802(3) that includes a third logical address LA3 mapped to a RAM address RA_C, and so on. The RAM addresses RA_A, RA_B, RA_C may be representative of any RAM addresses associated with the memory locations 702 of the address data structure RAM memory area 700, and do not necessarily refer to any particular RAM addresses.

In addition, for some example configurations, each entry in the table 800 may be indexed according to the logical addresses. The RAM communication module 134 may be configured to access the table 800 and use the logical address included in the host read request to identify the corresponding entry of the table 800—i.e., the entry in the table 800 with a logical address that matches the logical address included in the host read request. In response to identifying the corresponding entry in the table 800, the RAM communication module 134 may be configured to identify the associated RAM address.

In other example configurations, the RAM communication module 134 may be configured to identify an associated RAM address through a way other than by accessing a table. For example, the RAM communication module 134 may be configured to execute an algorithm that translates a logical address to the associated RAM address. Other ways or combinations of ways may be possible.

Referring again to FIGS. 2A, 3 and 7, in response to identifying an associated RAM address, the RAM communication module 134 may be configured to send a RAM read request to the RAM 116 that requests to read the logical-to-physical address entry stored at the associated RAM address. Referring further to FIG. 3, the RAM communication module 134 may be configured to send the RAM read request to the global interface (I/F) 312. In response, the global interface 312 may be configured to route the RAM read request to the bank group that has the memory location 702 identified by the RAM address. The bank group, or a particular bank of the bank group, that receives the RAM read request may be configured to process the RAM read request and return the logical-to-physical address entry stored at the RAM address to the global interface 312 via an associated local interface 310. In response, the global interface 312 may send the logical-to-physical address entry to the RAM communication module 134.

In response to receipt of the logical-to-physical address entry, the RAM communication module 134 may be configured to communicate with one or more other modules to have the data set associated with the logical address retrieved from the memory dies 104. For example, the physical address identified in the logical-to-physical address entry may be an abstract physical address, such as a metablock address. The RAM communication module 134, either alone or in conjunction with the media management layer module 138, may be configured to translate the abstract physical address to an actual physical address of the memory dies 104 where the data set is stored. The actual physical address may identify a chip enable group, a memory die, a block, a plane, a page, or any other actual structural or physical feature, or combination of actual structural or physical features, that identifies where the data set is stored. The RAM communication module 134 and/or the media management layer module 138, may be configured to provide the actual physical address to the sequencer module 126. In response, the sequencer module 126 may be configured to generate one or more context commands and send the one or more context commands to the memory dies 104 via the memory interface 130. In response, the memory dies 104 may be configured to retrieve the data set stored at the actual physical address and send the data set to the controller 102 or otherwise have the data set loaded in a buffer pool portion of the RAM 116. Upon being loaded in the RAM 116, the ECC engine 124 may perform error detection and correction on the data set. Upon completion of the error detection and correction, the front end module 108 may send the data set to the host device for completion of the host read request.

In many commonly-occurring situations, the host device may send a host read request that identifies, or multiple host read requests at substantially the same time that identify, consecutive logical addresses. As previously described, the host device may maintain a range of logical addresses, such as a range of LBA numbers. The logical addresses in the range may be in a sequential order, such as a sequential order in which the logical addresses continually increase in logical address number or value from a first logical address number to a last logical address number. As used herein, consecutive logical addresses are logical addresses (e.g., LBA numbers) that are consecutively or sequentially positioned next to each other in the range of logical addresses.

Such read situations where the host device sends consecutive logical addresses occur because the host device wants to read from the memory dies 104 or program into the memory dies 104 a relatively large set or "chunk" of data. The host device may identify that the data "chunk" is of a sufficiently large size such that it needs multiple logical addresses to identify the total memory area where the data chunk is stored. In other words, the size of the data chunk exceeds the size of a memory area identified by a single logical address. Despite needing multiple logical addresses, the host device may recognize the data chunk as a single data entity or a continuous sequence of data elements, and so the host device may have assigned the data chunk to be stored in a memory area defined by or otherwise corresponding to consecutive logical addresses.

With respect to utilizing the RAM 116 during these read situations, the RAM communication module 134 may be configured to send one RAM read request to the RAM 116 for each logical-to-physical address entry the RAM communication module 134 needs to read. Since each logical-to-physical address entry may identify a single logical address, then in response to receipt of one or more host read requests identifying multiple logical addresses, the RAM communication module 134 may be configured to send one RAM read request for each logical address included in the one or more host read requests. Accordingly, if the storage device 100 receives one or more host read requests identifying consecutive logical addresses, the RAM communication module 134 may be configured to send multiple RAM read requests to the RAM 116 to read multiple logical-to-physical address entries, one for each of the consecutive logical addresses.

With respect to write requests, when the storage device 100 receives, from a host device, a host write request to write a data set from the memory dies 104, the host write request may include a logical address that identifies, from the host device's perspective, where the data set that the host device wants written is stored in the memory device. In general, write operations are performed under three situations. In a first situation, the host device wants a current data set currently stored in the memory dies 104 to be overwritten or replaced with a new data set. In this first situation, the storage device 100 may receive a host write request that includes a logical block address that is already mapped to a physical address where the current data set is stored. In response to receipt of the host write request, the RAM communication module 134 may be configured to access the table 800 and use the logical address included in the host write request to identify the corresponding entry of the table 800—i.e., the entry in the table 800 with a logical address that matches the logical address included in the host write request. In response to identifying the corresponding entry in the table 800, the RAM communication module 134 may be configured to identify the associated RAM address.

In response to identifying the associated RAM address, the RAM communication module 134 may be configured to send a RAM read request to the RAM 116 that requests to read the logical-to-physical address entry stored at the associated RAM address. The interface and bank group components of the RAM 116 may handle the RAM read request the same way as previously described with respect to host read requests, and return the requested logical-to-physical address entry to the RAM communication module 134. Upon receipt of the logical-to-physical address entry, the RAM communication module 134 may identify the physical address where the current data set is being stored.

As part of the host write request received under the first situation, the host device may also send the new data set that is to overwrite or replace the current data set stored in the memory dies 104. The storage device 100 may temporarily store the new data set in the RAM 116 before being programmed into the memory dies 104. In response to receipt of the new data set, the storage device 100 may overwrite the current data set stored at the physical address identified in the returned logical-to-physical address entry with the new data set. For example, the sequencer module 126 may be configured to generate one or more context commands and send the one or more context commands along with the new data set to the memory dies 104 via the memory interface 130. In response to receipt of the context commands and the data set, the memory dies 104 may operate to overwrite the current data set with the new data set in the physical memory location corresponding to the physical address identified in the returned logical-to-physical address entry.

In a second situation, the host device may send a host write request that identifies a logical address for which there exists no present logical-to-physical address entry. That is, the new data set that the host device wants written into the memory dies 104 does not have a corresponding current data set currently being stored in the memory dies 104 that is to be overwritten. For this second situation, the media management layer 138 may be configured to access a free block list that identifies physical addresses of available memory locations in which to store the new data set. Upon accessing the free block list, the media management layer 138 may be configured to identify an available physical address and determine to store the new data set in a memory location of the memory dies 104 associated with the identified available physical address. Upon identifying the physical address in the free block list, the media management layer 138 may communicate with the sequencer module 126 to store the new data set in the memory location associated with the physical address.

In addition, the media management layer 138 may communicate with the RAM communication module 134 to have a new logical-to-physical address entry stored in a memory location 702 of the address data structure RAM memory area 700. For example, the media management layer 138 may communicate the physical address to the RAM communication module 134. In response, the RAM communication module 134 may identify an available memory location 702 in which to store the new logical-to-physical address entry. The RAM communication module 134 may add an entry into the table 800 that maps the logical address included in the host write request to a RAM address identifying the available memory location 702. In addition, the RAM communication module 134 may create a logical-to-physical address entry that maps the logical address included in the host write request with the physical address that the media management layer 138 identified from the free block list. The RAM communication module 134 may be configured to store the logical-to-physical address entry in the available memory location 702. To do so, the RAM communication module 134 may send a RAM write request to the RAM 116 that identifies the RAM address where the logical-to-physical address entry is to be stored. The RAM communication module 134 may also send the logical-to-physical address entry to the RAM 116. In response, the global interface 312 may route the RAM write request and the logical-to-physical address entry to the appropriate local interface 310, which in turn may send the RAM write request and the logical-to-physical address entry to the banks 304 of the associated bank group 308. In turn, the one or more banks 304 of the associated bank group 304 receiving the logical-to-physical address entry may write or program the logical-to-physical address entry into the available memory location 702.

A third situation may involve a combination or hybrid of the first and second situations. In particular, the host device may send a host write request that identifies a logical block address and a new data set that is to be overwritten or replaced in the memory dies 104, similar to the first situation. However, instead of overwriting the current data set, the storage device 100 may decide to store the new data set in an available memory location that is not currently storing any data. Accordingly, similar to the second situation, the media management layer 138 may identify a new physical address from a free block list and have the new data set stored in the available memory location associated with the new physical address identified in the free block list. Also, the RAM communication module 134 may be configured to replace the existing logical-to-physical address entry with a new logical-to-physical address entry that maps the logical address to the new physical address. In a particular example configuration, the RAM communication module 134 may be configured to issue a RAM write request to the RAM 116 to cause the RAM 116 to overwrite the existing logical-to-physical address entry with the new logical-to-physical address entry. This way, the logical-to-physical address entry associated with the same logical address stays loaded in the same memory location 702 despite the logical address being associated with a new physical address. In replacing the existing logical-to-physical address entry with the new logical-to-physical address entry, the current data set, now the old data set, may be recognized as obsolete or invalid and will not be accessed if the storage device 100 subsequently receives a host read request to read the data set.

Similar to read situations, the host device may send a host write request that identifies, or multiple host write requests at substantially the same time that identify, consecutive logical addresses. Like the read situations, the host device may do so because it wants a relatively large set or "chunk" of data programmed into the memory dies 104. Depending on the particular write situation as previously described, the RAM communication module 134 may respond to the one or more write requests by issuing a plurality of RAM read requests to the RAM 116 to identify physical addresses associated with the consecutive logical addresses where current data sets are stored in the memory dies 104. Alternatively, the RAM communication module 134 may issue, to the RAM 116, a plurality of RAM write requests accompanied with new logical-to-physical address entries associated with the consecutive logical addresses to be stored in memory locations 702.

As previously described, a RAM access request is a request for an action to be performed on one or more banks 304 within a bank group 308 of the RAM 116, and a RAM access operation is an operation performed on one or more banks 304 in response to a RAM access request. In the context of logical-to-physical address entries, the RAM communication module 134 may issue a RAM access request in the form of a RAM read request to read a logical-to-physical address entry from a memory location 702, and may issue a RAM access request in the form of a RAM write request to write a logical-to-physical address entry to a memory location 702.

To minimize or optimize for the time needed to perform RAM access operations, the RAM communication module 134 may be configured to store the logical-to-physical address entries in the memory locations 702 of the address data structure RAM memory area 700 in accordance with a first address entry distribution scheme in which consecutive logical-to-physical address entries are distributed across different bank groups. As used herein, the term consecutive logical-to-physical address entries refer to at least two logical-to-physical address entries associated with at least two consecutive logical addresses. Conversely, non-consecutive logical-to-physical address entries refer to at least two logical-to-physical address entries associated with at least two non-consecutive logical addresses. Also, as used herein, a logical-to-physical address entry that is part of a pair of consecutive logical-to-physical address entries may be referred to as a consecutive counterpart to the other logical-to-physical address entry of the pair.

A minimum or baseline criterion of the first address entry distribution scheme is that at least one pair of consecutive logical-to-physical address entries associated with consecutive logical addresses is stored in two memory locations 702 that are located in different bank groups, and where the two memory locations are both non-last memory locations of their respective bank groups. As used herein, a non-last memory location is a memory location of a bank group other than the last memory location 702(L). In some example configurations of the first scheme, among all of the plurality of logical-to-physical address entries of the RAM address data structure stored in the address data structure RAM memory area 700, no two consecutive logical-to-physical address entries are stored in the same bank group.

For at least some example implementations of the first address entry distribution scheme, since consecutive logical-to-physical address entries are distributed across different bank groups, consecutively-addressed memory locations 702 within a single bank group may store non-consecutive logical-to-physical address entries of the address data structure. For example, with reference to FIG. 7, consecutively-addressed memory locations of the first set of memory locations of the first bank group 308(1) may store a first set of non-consecutive logical-to-physical address entries; consecutively-addressed memory locations of the second set of memory locations of the second bank group 308(2) may store a second set of non-consecutive logical-to-physical address entries; consecutively-addressed memory locations of the third set of memory locations of the third bank group 308(3) may store a third set of non-consecutive logical-to-physical address entries; and consecutively-addressed memory locations of the fourth set of memory locations of the fourth bank group 308(4) may store a fourth set of non-consecutive logical-to-physical address entries.

The first address entry distribution scheme for storing logical-to-physical address entries in the address data structure RAM memory area 700 may be in contrast to a second, different address entry distribution scheme in which consecutive logical-to-physical address entries are stored in the memory locations 702 in direct relation to the sequential order of the RAM addresses of a bank group. Under this second scheme, a next logical-to-physical address entry is stored in a memory location 702 having a next RAM address of the sequence. Otherwise stated, consecutive logical-to-physical address entries are stored in consecutive memory locations 702. So, for example, a first logical-to-physical address entry associated with a first logical address is stored in the first memory location 702(1) of the first bank group 308(1), a second logical-to-physical address entry associated with a second logical address is stored in the second memory location 702(1) of the first bank group 308(1), a third logical-to-physical address entry associated with a third logical address is stored in the third memory location 702(3) of the first bank group 308(1), and so on. If the last memory location 702(L) of the first bank group 308(1) is filled with a logical-to-physical address entry and there are still logical-to-physical address entries to be stored in the RAM 116, then a next logical-to-physical address entry may be stored in a first memory location 308(1) of a next bank group, such as the second bank group 308(2) for example, and consecutive logical-to-physical address entries may be sequentially stored in consecutive memory locations 702 of the next bank group.

Where the second address entry distribution scheme is implemented, then for situations where the storage device 100 receives one or more host read requests identifying consecutive logical addresses, the RAM communication module 134 will issue multiple RAM read requests to read consecutive logical-to-physical address entries, and consecutive logical-to-physical address entries will be read, from the same bank group the vast majority of the time. That is, in only a few situations, particularly where the first of two consecutive logical-to-physical address entries is stored in a last memory location 702(L) of a bank group, will the RAM communication module 134 issue two RAM read requests for two consecutive logical-to-physical address entries to two different bank groups and the two different bank groups will read the two consecutive logical-to-physical address entries. Similarly, for situations where the storage device 100 receives one or more host write commands identifying two consecutive logical addresses and the second address entry distribution scheme is implemented, the vast majority of the time, the same bank group will be either reading or writing two consecutive logical-to-physical address entries for execution of the one or more host write commands.

In contrast, where the first address entry distribution scheme is implemented, for at least the majority of times, if not for all of the time, when the RAM communication module 134 sends two RAM access requests associated with two consecutive logical-to-physical address entries to the RAM 116 (e.g., two RAM read requests to read two consecutive logical-to-physical address entries from the RAM 116 or two RAM write requests to write two consecutive logical-to-physical address entries into the RAM 116), the two RAM access requests are sent to and processed by two different bank groups. As previously described, the parallel structure of the bank groups allows two RAM access requests to be processed by two different bank groups faster compared to if the two RAM access requests are processed by the same bank group. The first address entry distribution scheme may leverage the parallel structure of the bank groups by distributing consecutive logical-to-physical address entries across different bank groups. Accordingly, where the logical-to-physical address entries are distributed across different bank groups under the first address entry distribution scheme instead of being sequentially stored in memory locations according to the sequential order of the RAM addresses under the second address entry distribution scheme, then when the storage device 100 receives one or more host read requests or write requests identifying consecutive logical addresses, the RAM communication module 134 may send a larger proportion of the RAM access requests to different bank groups under the first address distribution scheme compared to the second address distribution scheme. In turn, where the first address entry distribution scheme is implemented instead of the second address entry distribution scheme, the RAM communication module 134 may be configured to retrieve from the RAM 116 or program into the RAM 116 consecutive logical-to-physical address entries faster.

The first address entry distribution scheme may provide additional benefits of improved access time and reduced latency for situations other than where the storage device 100 receives one or more host read or write commands expressly identifying consecutive logical addresses. For example, the first address entry distribution scheme may reduce latency when performing pre-fetch or read-ahead read operations. For such operations, the controller 102 may be configured to retrieve certain data from the memory dies 104 in response to a prediction or assumption that the host device wants the data read, but before the controller 102 actually receives a host read request requesting for the data to be read. A pre-fetch or read-ahead operation may be performed particularly for reading sequential data associated with sequential or consecutive logical addresses. Accordingly, to perform a read-ahead or pre-fetch operation, the RAM communication module 134 may send multiple RAM read requests identifying consecutive logical addresses to the RAM 116.

As another example, the first address entry distribution scheme may reduce latency when performing an address data structure flush operation. As previously described, updates to the address directory system that occur during operation of the storage device 100 may be made to the address data structure loaded into the RAM 116. During certain situations, such as after a certain amount of operation time has elapsed or during a power down operation, it may be desirable to copy all or some of the address data structure loaded into the RAM 116 back into the non-volatile memory dies 104, at least so that the updates to the address directory system are not lost. This operation of copying the version of the address data structure in the RAM 116 into the non-volatile memory dies 104 may be referred to as flushing. Flushing the address data structure in the RAM 116 into the non-volatile memory dies 104 involves reading the address data structure from the RAM 116. As such, by storing the address data structure into the RAM 116 using the first address entry distribution scheme, the latency incurred when reading the address data structure from the RAM 116, and in turn the time needed to perform a flushing operation, may be reduced.

As another example, the latency or time needed to load the address data structure into the RAM 116, such as during initialization, may also be reduced. In particular, loading the address data structure from the memory dies 104 into the RAM 116 may include sequentially writing sequential logical-to-physical address entries into the RAM 116. By sequentially writing sequential logical-to-physical address entries into different bank groups instead of the same bank group, the sequential write operations can be performed in parallel, thereby reducing the time needed to load the address data structure into the RAM 116, such as during initialization.

In addition, during operation of the storage device 100, the media management layer 138 may determine perform a write operation without expressly receiving a host write request. For example, the media management layer 138 may determine to move a data set currently being stored in a first memory area of the memory dies 104 to a second memory area, such as part of a wear leveling operation, a garbage collection operation, or a folding operation, as non-limiting examples. In response to selection of the second memory area, the RAM communication module 134 may create one or more new logical-to-physical address mappings between one or more logical addresses associated with the data set and one or more physical addresses of the second memory area. In turn, the RAM communication module 134 may be configured to issue RAM write requests to store the logical-to-physical address entries in the RAM 116. If the new logical-to-physical address entries are consecutive—i.e., they are associated with consecutive logical addresses, then the RAM communication module 134 may issue the RAM write requests such that two different block groups will program the two new consecutive logical-to-physical address entries.

The RAM communication module 134 may be configured to determine where in the address data structure RAM memory area 700 to store logical-to-physical address entries of newly-created logical-to-physical address mappings and store the logical-to-physical address entries in the address data structure RAM memory area 700 in accordance with the first address entry distribution scheme. The RAM communication module 134 may also be configured to maintain or manage the table 800 identifying where the logical-to-physical address entries are stored in the RAM 116.

The RAM communication module 134 may be configured to determine where the logical-to-physical address entries are to be stored in the memory locations 702 of the address data structure RAM memory area 700 and correspondingly manage the table 800 under the first address entry distribution scheme in various ways. As previously described, a minimum or baseline criterion for the first scheme may be that at least one pair of consecutive logical-to-physical address entries is stored in two memory locations 702 that are located in different bank groups, and where the two memory locations are both non-last memory locations of their respective bank groups. For some example implementations, the RAM communication module 134 may be configured to store logical-to-physical address entries in the memory locations 702 and manage the table 800 according to the second address entry distribution scheme, or any other address entry distribution scheme, as long as the minimum or baseline criterion of the first scheme is satisfied. In other example implementations, the RAM communication module 134 may be configured to store logical-to-physical address entries in the memory locations 702 and manage the table 800 under the first scheme such that at least a predetermined number or a predetermined percentage of pairs of consecutive logical-to-physical address entries has a first logical-to-physical address entry stored in one bank group and a second logical-to-physical address entry stored in a different bank group. As long as the predetermined number or the predetermined percentage is satisfied, the RAM communication module 134 may determine to store a logical-to-physical address entry in any of the bank groups without concern for whether a consecutive counterpart is also stored in the same bank group.

In other example implementations, the address data structure RAM memory area 700 may include one portion that stores the logical-to-physical address entries in accordance with the first address entry distribution scheme and a second portion that stores the logical-to-physical address entries in accordance with the logical-to-physical address entries in accordance with the second address entry distribution. For example, in the first portion, which may extend over multiple bank groups, consecutively-addressed memory locations 702 may store non-consecutive logical-to-physical address entries, and in the second portion, consecutively-address stored locations 702 may store consecutive logical-to-physical address entries. The second portion may be part of one or more of the same bank groups as the first portion, or may extend over one or more different or separate bank groups than the first portion.

In other example implementations, the RAM communication module 134 may be configured to determine a memory location 702 for a newly-created logical-to-physical address entry at random by randomly selecting an available memory location, provided that the memory location 702 that is randomly selected is in a bank group that is different from a bank group in which a consecutive logical-to-physical address entry is stored.

In other example implementations, the RAM communication module 134 may be configured to store every Nth logical-to-physical address entry associated with every Nth logical address in the same bank group, where N is the number of bank groups over which the address data structure RAM memory area 700 extends. Otherwise stated, each bank group may be configured to store a different set of every Nth logical-to-physical address entries. For example, with reference to FIG. 7, if the address data structure RAM memory area 700 extends over four bank groups, then every fourth logical-to-physical address entry may be stored in the same bank group. Accordingly, a first set of every fourth logical-to-physical address entry may be stored in the first bank group 308(1), a second set of every fourth logical-to-physical address entry may be stored in the second bank group, a third set of every fourth logical-to-physical address entry may be stored in the third bank group, and a fourth set of every fourth logical-to-physical address entry may be stored in the fourth bank group. For a particular example that includes sixteen logical-to-physical address entries associated with sixteen logical addresses, the first set may include the first, fifth, ninth, and thirteenth logical-to-physical address entries; the second set may include the second, sixth, tenth, and fourteenth logical-to-physical address entries; the third set may include the third, seventh, eleventh, and fifteenth logical-to-physical address entries; and the fourth set may include the fourth, eighth, twelfth, and sixteen logical-to-physical address entries.

In a particular example implementation of the first address entry distribution scheme where every Nth logical-to-physical address entry is stored in the same bank group, consecutive logical-to-physical address entries of a set in the same bank group may be located in different banks of the bank group. As used herein, two logical-to-physical address entries in a set of every Nth logical-to-physical address entries are consecutive logical-to-physical address entries if their associated logical addresses are only N logical addresses apart from each. To illustrate using the above example, the first and fifth logical-to-physical address entries of the first set may be consecutive entries of the first set because they are four (i.e., N=4) logical entries apart from each other.

In a further particular example implementation of the first address entry distribution scheme where every Nth logical-to-physical address entry is stored in the same bank group, within a particular bank group, each bank may store every Mth logical-to-physical address entry of an associated set of every Nth logical-to-physical address entries. This may equate to a single bank of a bank group within the address data structure RAM memory area 700 storing every (N×M)th logical-to-physical address entry. To illustrate, suppose the address data structure RAM memory area 700 expands four bank groups (N=4), with four banks (M=4) within each bank group. Accordingly, each bank of a bank group may store a different set of every sixteenth (4×4) logical-to-physical address entry. To illustrate, expanding upon the example above, the first bank of the first bank group may store the first, seventeenth, thirty-third, (and so on) logical-to-physical address entries; the second bank of the first bank group may store the fifth, twenty-first, thirty-seventh (and so on) logical-to-physical address entries; the third bank of the first bank group may store the ninth, twenty-fifth, forty-first (and so on) logical-to-physical address entries; and the fourth bank of the first bank group may store the thirteenth, twenty-ninth, forty-fifth (and so on) logical-to-physical address entries. The banks of the other bank groups may similarly store every (N×M)th logical-to-physical address entries in accordance with the respective sets of every Nth logical-to-physical address entries.

Also, how many logical-to-physical address entries a given bank may store may depend on the number of memory locations 702 in a given bank (e.g., a total capacity of the given bank) and a size of the logical-to-physical address entries. Such size parameters may be dependent on the specific technology of the RAM 116 and the size formatting to identify the logical and physical addresses to form the logical-to-physical address mappings, and may vary depending on the configuration of the storage device 100.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where they direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

We claim:

1. A method for a storage system, comprising:
    writing logical-to-physical address entries of an address data structure into one or more memories comprising a first memory area and a second memory area, wherein the second memory area is different from the first memory area;
    performing first multiple access requests to a first portion of the one or more memories, wherein the first multiple access requests are directed to one of the first and second memory areas but not both of the first and second memory areas, and wherein consecutively-addressed memory locations of the first portion store non-consecutive logical-to-physical address entries;
    performing second multiple access requests to a second portion of the one or more memories, wherein a first one of the second multiple access requests is directed to a first one of the first and second memory areas, wherein a second one of the second multiple access requests is directed to a second one of the first and second memory areas, wherein the second one is different from the first one, and wherein consecutively-addressed memory locations of the second portion store consecutive logical-to-physical address entries;
    determining that at least a first number or a first percentage of pairs of consecutive logical-to-physical address entries has a first logical-to-physical address entry stored in a certain one of the first memory area or the second memory area and has a second logical-to-physical address entry stored in another one of the first memory area or the second memory area, wherein the another one is different from the certain one;
    when the first number satisfies a predetermined number or the first percentage satisfies a predetermined percentage, writing a first logical-to-physical address entry into a given memory area of the first memory area or the second memory area without determining whether a consecutive logical-to-physical address entry is stored in the same given memory area; and when the first number fails to satisfy the predetermined number and the first percentage fails to satisfy the predetermined percentage, writing a first logical-to-physical address entry into a particular memory area of the first memory area or the second memory area after determining whether a consecutive logical-to-physical address entry is stored in the same particular memory area, wherein the second multiple access requests are performed faster than the first multiple access requests.

2. The method of claim 1, wherein:
both of the first memory area and the second memory area are volatile memories;
the first memory area is accessible via a first interface;
the second memory area is accessible via a second interface;
the second multiple access requests are performed 33-50% faster than the first multiple access requests; and
the first one and the second one of the second multiple access requests are performed in parallel.

3. The method of claim 1, wherein:
the one or more memories comprise an N-number of memory areas, wherein N is a positive integer;
each of the N-number of memory areas comprises a respective one of bank groups, wherein each of the bank groups comprises an M-number of banks, and wherein M is a positive integer; and
each of the banks is caused to store a different set of every (N×M)th logical-to-physical address entries.

4. The method of claim 1, comprising:
randomly selecting a memory location to store a logical-to-physical address entry, wherein the randomly selected memory location is in a given one of the first memory area or the second memory area, and wherein the given one is different from a memory area in which a consecutive logical-to-physical address entry is stored.

5. The method of claim 1,
wherein the consecutive logical-to-physical address entries for the determining comprise at least two logical-to-physical address entries associated with at least two consecutive logical addresses.

6. The method of claim 1, wherein:
writing the logical-to-physical address entries of the address data structure comprises: writing non-consecutive logical-to-physical address entries of the address data structure into consecutively-addressed memory locations of the first memory area; and
the non-consecutive logical-to-physical address entries of the address data structure comprise at least two logical-to-physical address entries associated with at least two non-consecutive logical addresses.

7. A storage system, comprising:
one or more memories comprising a first memory area and a second memory area, wherein the second memory area is different from the first memory area; and
one or more controllers configured to cause:
writing logical-to-physical address entries of an address data structure into the one or more memories;
performing first multiple access requests to a first portion of the one or more memories, wherein the first multiple access requests are directed to one of the first and second memory areas but not both of the first and second memory areas and wherein consecutively-addressed memory locations of the first portion store non-consecutive logical-to-physical address entries;
performing second multiple access requests to a second portion of the one or more memories, wherein a first one of the second multiple access requests is directed to a first one of the first and second memory areas, wherein a second one of the second multiple access requests is directed to a second one of the first and second memory areas, wherein the second one is different from the first one, and wherein consecutively-addressed memory locations of the second portion store consecutive logical-to-physical address entries;
determining that at least a first number or a first percentage of pairs of consecutive logical-to-physical address entries has a first logical-to-physical address entry stored in a certain one of the first memory area or the second memory area and has a second logical-to-physical address entry stored in another one of the first memory area or the second memory area, wherein the another one is different from the certain one;
when the first number satisfies a predetermined number or the first percentage satisfies a predetermined percentage, writing a first logical-to-physical address entry into a given memory area of the first memory area or the second memory area without determining whether a consecutive logical-to-physical address entry is stored in the same given memory area; and
when the first number fails to satisfy the predetermined number and the first percentage fails to satisfy the predetermined percentage, writing a first logical-to-physical address entry into a particular memory area of the first memory area or the second memory area after determining whether a consecutive logical-to-physical address entry is stored in the same particular memory area,
wherein the one or more controllers are configured to cause performing the second multiple access requests faster than performing the first multiple access requests.

8. The storage system of claim 7, comprising a first interface and a second interface,
wherein:
both of the first memory area and the second memory area are volatile memories;
the first memory area is accessible via the first interface;
the second memory area is accessible via the second interface; and
the first one and the second one of the second multiple access requests are performed in parallel.

9. The storage system of claim 7, wherein:
the one or more memories comprise an N-number of memory areas, wherein N is a positive integer;
each of the N-number of memory areas comprises a respective one of bank groups, wherein each of the bank groups comprises an M-number of banks, and wherein M is a positive integer; and
the one or more controllers are configured to cause each of the banks to store a different set of every (N×M)th logical-to-physical address entries.

10. The storage system of claim 7, wherein the one or more controllers are configured to cause:
randomly selecting a memory location to store a logical-to-physical address entry, wherein the randomly selected memory location is in a given one of the first memory area or the second memory area, and wherein the given one is different from a memory area in which a consecutive logical-to-physical address entry is stored.

11. The storage system of claim 7, wherein the consecutive logical-to-physical address entries for the determining comprise at least two logical-to-physical address entries associated with at least two consecutive logical addresses.

12. The storage system of claim 7, wherein: writing the logical-to-physical address entries of the address data structure comprises: writing non-consecutive logical-to-physical address entries of the address data structure into consecutively-addressed memory locations of the first memory area; and the non-consecutive logical-to-physical address entries of the address data structure comprise at least two logical-to-physical address entries associated with at least two non-consecutive logical addresses.

13. The storage system of claim 7, wherein the one or more memories further comprise a third memory area comprising consecutively-addressed memory locations configured to store consecutive logical-to-physical address entries.

14. The storage system of claim 7, wherein the one or more controllers are configured to cause:

when a first of two consecutive logical-to-physical address entries is stored in a last memory location of a memory area:
issuing, to two different memory areas, two read requests for the two consecutive logical-to-physical address entries; and
reading the two consecutive logical-to-physical address entries from the two different memory areas.

15. The storage system of claim 7, wherein the one or more controllers are configured to cause:

determining that at least one pair of consecutive logical-to-physical address entries associated with consecutive logical addresses are stored in two memory locations that are located in different memory areas; and determining that the two memory locations are both non-last memory locations of their respective memory areas.

16. An apparatus, comprising:

means for writing logical-to-physical address entries of an address data structure into one or more memories comprising a first memory area and a second memory area, wherein the second memory area is different from the first memory area;

means for performing first multiple access requests to a first portion of the one or more memories, wherein the first multiple access requests are directed to one of the first and second memory areas but not both of the first and second memory areas and wherein consecutively-addressed memory locations of the first portion store non-consecutive logical-to-physical address entries;

means for performing second multiple access requests to a second portion of the one or more memories, wherein a first one of the second multiple access requests is directed to a first one of the first and second memory areas, wherein a second one of the second multiple access requests is directed to a second one of the first and second memory areas, wherein the second one is different from the first one, and wherein consecutively-addressed memory locations of the second portion store consecutive logical-to-physical address entries;

means for determining that at least a first number or a first percentage of pairs of consecutive logical-to-physical address entries has a first logical-to-physical address entry stored in a certain one of the first memory area or the second memory area and has a second logical-to-physical address entry stored in another one of the first memory area or the second memory area, wherein the another one is different from the certain one;

when the first number satisfies a predetermined number or the first percentage satisfies a predetermined percentage, means for, writing a first logical-to-physical address entry into a given memory area of the first memory area or the second memory area without determining whether a consecutive logical-to-physical address entry is stored in the same given memory area; and when the first number fails to satisfy the predetermined number and the first percentage fails to satisfy the predetermined percentage, means for, writing a first logical-to-physical address entry into a particular memory area of the first memory area or the second memory area after determining whether a consecutive logical-to-physical address entry is stored in the same particular memory area, wherein the apparatus is configured to cause performing the second multiple access requests faster than performing the first multiple access requests.

17. The apparatus of claim 16, wherein:

the one or more memories comprise an N-number of memory areas, wherein N is a positive integer;

each of the N-number of memory areas comprises a respective one of bank groups, wherein each of the bank groups comprises an M-number of banks, and wherein M is a positive integer; and each of the banks is caused to store a different set of every (N×M)th logical-to-physical address entries.

18. The apparatus of claim 16, comprising a first interface and a second interface, wherein:

both of the first memory area and the second memory area are volatile memories;

the first memory area is accessible via the first interface;

the second memory area is accessible via the second interface; and the first one and the second one of the second multiple access requests are performed in parallel.

* * * * *